(12) United States Patent
Leclere et al.

(10) Patent No.: US 10,870,730 B2
(45) Date of Patent: Dec. 22, 2020

(54) SOLID ELECTROLYTE FOR AN ELECTROCHEMICAL GENERATOR

(71) Applicant: COMMISSARIAT A L'ENERGIE ATOMIQUE ET AUX ENERGIES ALTERNATIVES, Paris (FR)

(72) Inventors: Melody Leclere, La-Batie-Montgascon (FR); Lionel Picard, Seyssinet-Pariset (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 212 days.

(21) Appl. No.: 15/761,305

(22) PCT Filed: Sep. 19, 2016

(86) PCT No.: PCT/EP2016/072158
§ 371 (c)(1),
(2) Date: Mar. 19, 2018

(87) PCT Pub. No.: WO2017/050691
PCT Pub. Date: Mar. 30, 2017

(65) Prior Publication Data
US 2018/0265634 A1    Sep. 20, 2018

(30) Foreign Application Priority Data
Sep. 21, 2015  (FR) .................... 15 58863

(51) Int. Cl.
*C08G 73/02* (2006.01)
*C08G 77/60* (2006.01)
(Continued)

(52) U.S. Cl.
CPC ....... *C08G 73/0206* (2013.01); *C08G 73/024* (2013.01); *C08G 73/0246* (2013.01);
(Continued)

(58) Field of Classification Search
CPC .............. C08G 73/0206; C08G 73/024; C08G 73/0246; C08G 77/54; C08G 77/60; C08G 79/00; C08G 79/06
See application file for complete search history.

(56) References Cited

U.S. PATENT DOCUMENTS 4,647,644 A * 3/1987 Panster ................... B01J 39/17
528/25
5,378,403 A * 1/1995 Shacklette ......... C08G 73/0266
252/500
(Continued)

FOREIGN PATENT DOCUMENTS

FR      2 979 630 A1    3/2013
WO      00/05774 A1     2/2000

OTHER PUBLICATIONS

Rachid Meziane, et al., "Single-ion polymer electrolytes based on a delocalized polyanion for lithium batteries," Electrochimica Acta, No. 57, Mar. 16, 2011, pp. 14-19.
(Continued)

*Primary Examiner* — Amanda C. Walke
(74) *Attorney, Agent, or Firm* — Oblon, McClelland, Maier & Neustadt, L.L.P.

(57) ABSTRACT

A compound containing at least one species of formula (I):

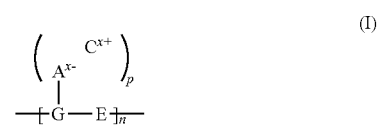

Figure 1:
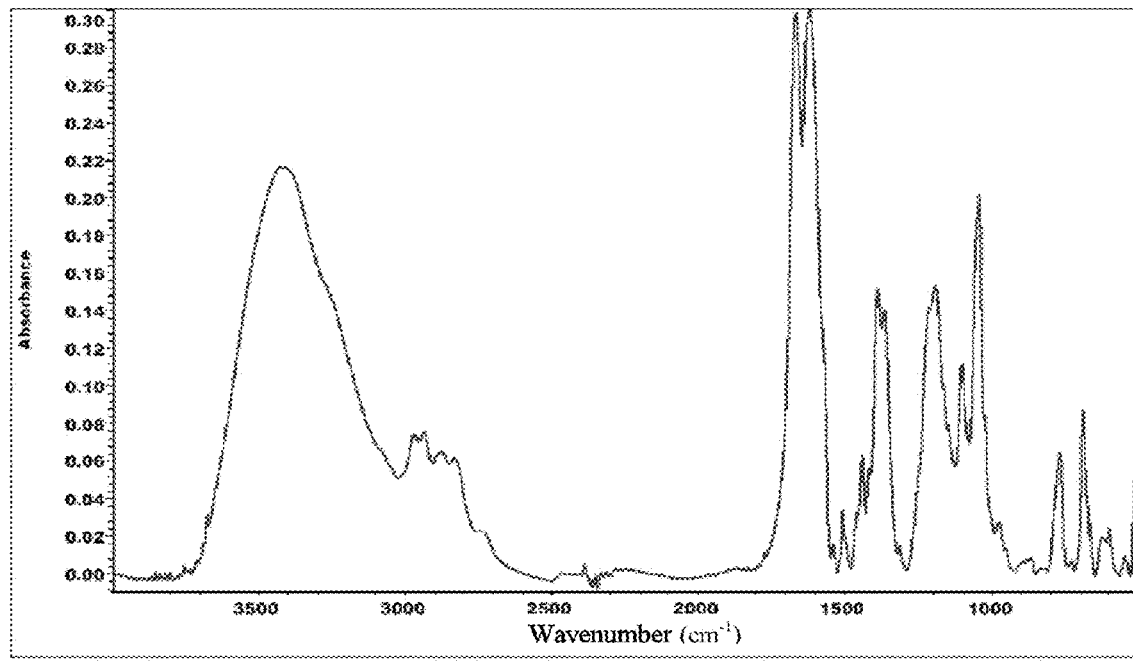

where:
$A^{x-}$ is an anion of valency x equal to 1 or 2 chosen from sulfonate, sulfonylimide of $-SO_2-N^--SO_2C_yF_{2y+1}$
(Continued)

type with y being an integer between 0 and 4; borate, borane, phosphate, phosphinate, phosphonate, silicate, carbonate, sulfide, selenate, nitrate and perchlorate anions;

$C^{x+}$ is a counter-cation of the anion $A^{x-}$, chosen from a proton $H^+$ and alkali metal and alkaline-earth metal cations;

p is an integer ranging from 1 to 10;

E is an organic spacer comprising a linear sequence of at least two covalent bonds;

n is an integer greater than or equal to 2; and

G represents:

(a) a group

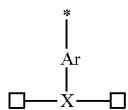

or (b) a group

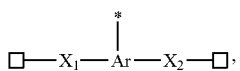

the anion $A^{x-}$ being covalently bonded to the polycyclic group Ar.

32 Claims, 14 Drawing Sheets

(51) Int. Cl.
| | |
|---|---|
| C08G 79/06 | (2006.01) |
| C08J 5/18 | (2006.01) |
| C09D 179/02 | (2006.01) |
| C09D 183/10 | (2006.01) |
| H01M 4/137 | (2010.01) |
| H01M 10/052 | (2010.01) |
| H01M 10/0565 | (2010.01) |
| C08G 77/54 | (2006.01) |
| H01M 8/1037 | (2016.01) |
| H01M 8/1034 | (2016.01) |
| H01M 8/1023 | (2016.01) |
| H01M 8/1027 | (2016.01) |
| H01M 8/103 | (2016.01) |
| H01M 8/1032 | (2016.01) |

(52) U.S. Cl.
CPC ............ *C08G 77/54* (2013.01); *C08G 77/60* (2013.01); *C08G 79/06* (2013.01); *C08J 5/18* (2013.01); *C09D 179/02* (2013.01); *C09D 183/10* (2013.01); *H01M 4/137* (2013.01); *H01M 8/103* (2013.01); *H01M 8/1023* (2013.01); *H01M 8/1027* (2013.01); *H01M 8/1032* (2013.01); *H01M 8/1034* (2013.01); *H01M 8/1037* (2013.01); *H01M 10/052* (2013.01); *H01M 10/0565* (2013.01); *C08J 2379/02* (2013.01); *H01M 2300/0082* (2013.01)

(56) References Cited

U.S. PATENT DOCUMENTS

| | | | | |
|---|---|---|---|---|
| 5,380,791 | A * | 1/1995 | Panster | B01J 31/10 524/837 |
| 5,408,034 | A | 4/1995 | Galaj et al. | |
| 5,459,007 | A * | 10/1995 | Larson | G03G 9/122 430/115 |
| 5,475,162 | A * | 12/1995 | Brandvold | C08G 77/52 564/485 |
| 5,844,069 | A | 12/1998 | Galaj et al. | |
| 6,544,670 | B1 * | 4/2003 | Kitano | C08G 77/26 428/690 |
| 6,955,806 | B2 * | 10/2005 | Fitzpatrick | A61K 31/74 424/402 |
| 7,781,558 | B2 * | 8/2010 | Schorzman | C07F 9/3808 526/279 |
| 7,851,580 | B2 * | 12/2010 | Li | H01M 8/1037 528/30 |
| 8,557,446 | B2 * | 10/2013 | Chervakov | C08G 69/26 429/247 |
| 9,156,939 | B2 * | 10/2015 | Ludemann | C08G 61/12 |
| 9,309,359 | B2 * | 4/2016 | Zhou | C08G 77/48 |
| 9,534,089 | B2 * | 1/2017 | Zhou | C08G 77/442 |
| 10,109,488 | B2 * | 10/2018 | Byl | H01J 37/08 |
| 2009/0247639 | A1 * | 10/2009 | Profy | A61K 31/795 514/577 |
| 2010/0288339 | A1 * | 11/2010 | Noguchi | C08G 61/02 136/252 |
| 2012/0129045 | A1 * | 5/2012 | Gin | H01B 1/122 429/189 |
| 2014/0272600 | A1 | 9/2014 | Bouchet et al. | |
| 2015/0056711 | A1 * | 2/2015 | Lei | C08G 73/0206 436/98 |
| 2017/0154766 | A1 * | 6/2017 | Ogihara | C08G 77/52 |
| 2020/0060614 | A1 * | 2/2020 | Hatakeyama | C08K 3/041 |

OTHER PUBLICATIONS

Morrel H. Cohen, et al., "Molecular Transport in Liquids and Glasses," The Journal of Chemical Physics, vol. 31, No. 5, Nov. 1959, 7 pages.

International Search Report dated Nov. 17, 2016 in PCT/EP2016/072158 filed Sep. 19, 2016.

French Search Report dated Jul. 5, 2016 in FR 1558863 filed Sep. 21, 2015.

U.S. Appl. No. 15/761,257, filed Mar. 19, 2018, Lionel Picard, et al.

* cited by examiner

SOLID ELECTROLYTE FOR AN ELECTROCHEMICAL GENERATOR

The present invention relates to novel compounds that can be used as solid electrolytes.

Such electrolytes may be used in various electrochemical systems or devices, especially in lithium batteries.

Conventionally, the operating principle of an electrochemical generator is based on the insertion and removal, also known as "deinsertion", of an alkali metal ion or of a proton into and from the positive electrode, and the deposition or extraction of this ion onto and from the negative electrode.

The main systems use $Li^+$ as ion species for transporting current. In the case of a lithium accumulator, for example, the $Li^+$ ion extracted from the cathode during discharging of the battery becomes deposited on the anode to be intercalated in the cathode during charging.

Transport of the proton or of the alkali or alkaline-earth metal cation, in particular the lithium ion, between the cathode and the anode is ensured by an ion-conducting electrolyte.

The formulation of the electrolyte used is an essential factor for the performance of the electrochemical system, in particular when said system is used at very low or very high temperatures. The ion conductivity of the electrolyte in particular conditions the efficiency of the electrochemical system, given that it has an influence on the mobility of the ions between the positive and negative electrodes.

Other parameters also have an influence on the choice of the electrolyte used. The factors concerned are especially its thermal, chemical or electrochemical stability in the electrochemical system, and also economic, safety and environmental protection criteria, especially including the toxicity of the electrolyte.

In general, the electrolytes of electrochemical systems are in liquid, gelled or solid form.

As regards electrolytes in liquid form, the conventional electrolytes of electrochemical generators with a metal cation from one of the first two columns of the Periodic Table of the Elements, for example lithium, are composed of a salt of this cation dissolved in an organic or aqueous medium (conventionally in carbonate solvents or acetonitrile for lithium batteries), in the presence or absence of additives.

For example, conventional supercapacitor electrolytes are composed of an organic salt (conventionally a tetraethylammonium tetrafluoroborate salt $Et_4N$—$BF_4$) dissolved in acetonitrile.

Their use as a complete electrochemical storage system, for example in an Li-ion battery, makes it necessary, however, to add a separator in order to ensure electrical insulation between the positive and negative electrodes. Also, although these electrolytes have good ion conductivities, they unfortunately have safety and cost problems in the context of using organic solvents (low thermal stability), and electrochemical stability problems in the context of use of an aqueous medium.

As regards gelled electrolytes, they are liquid electrolytes, for example as described previously, trapped in a "host" polymer. The solvent(s) of the liquid electrolyte must have affinity for the host polymer that is neither too strong (dissolution of the polymer) nor too weak (exudation). The matrix polymer must allow maximum incorporation of liquid while at the same time conserving mechanical properties to ensure physical separation between the two electrodes.

Finally, to satisfy safety problems associated with the presence of the solvent, it has been proposed to use solid polymer electrolytes. These polymers included in the composition of the electrolyte must have good ion-conducting properties so as to be able to be used satisfactorily in electrochemical storage and generator systems.

It is known practice, for example, to use, as polymer electrolytes not requiring the use of a separator, poly(oxyethylenes) POE in which is dissolved and alkali metal or alkaline-earth metal salt (depending on the chemistry of the electrodes). However, these electrolytes have limited performance qualities in terms of ion conductivity associated with the "assisted" cation transport mechanism ([1]), and require a high working temperature (60 to 80° C.). The polymers are thus conductors in a gelled physical state, bordering on the liquid state.

Mention may also be made, as polymer electrolyte, of the electrolytic membrane of electrochemical generator systems such as proton-exchange-membrane fuel cells, conventionally constituted of a polymer with a fluorocarbon main chain bearing side groups comprising sulfonic acid functions, such as Nafion®. At the present time, the use of polymers of this type for proton conduction requires, however, control of the degree of hydration of the membrane to obtain the desired performance. This type of polymer as a semicrystalline polymer, of which only the amorphous part has conduction properties, the crystalline part imparting the mechanical properties required for its correct functioning in a whole system.

Various studies were conducted for the purpose of increasing the ion-conducting performance of polymer electrolytes.

For example, patent application WO 00/05774 describes block copolymers with micro-phase separation, constituted of a first ion-conducting block, for example of polyethylene oxide, and of a second block, which is non-conducting and immiscible with the first block to ensure micro-phase separation, for example of polyalkyl acrylate or polydimethylsiloxane type. These polymer electrolytes do not require the addition of an additional salt since an anion (for example carboxylate, sulfonate or phosphate) is immobilized on the polymer.

A mixture of a polystyrene bearing sulfonyl(trifluoromethylsulfonyl)imide and POE groups to make an electrolyte membrane has also been proposed (Meziane et al. Electrochimica Acta, 2011, 57, 14-19). Unfortunately, these polymer electrolytes have insufficient ion conductivities, of the order of $9.5 \times 10^{-3}$ mS/cm at 70° C. Furthermore, for the majority of the current fields of application, it is not possible to use working temperatures above 70° C.

Finally, mention may also be made of FR 2 979 630, which proposes a solid electrolyte of a BA-type diblock copolymer or a BAB-type triblock copolymer, with A being an unsubstituted polyoxyethylene chain and B an anionic polymer formed from one or more monomers such as vinyl and derivatives, substituted with a sulfonyl(trifluoromethylsulfonyl)imide (TFSI) anion. The maximum conductivity, of the order of $10^{-2}$ mS/cm, is obtained at 60° C. with a polymer comprising 78% by mass of POE.

The need thus remains for a solid electrolyte which simultaneously has high ion conductivity and good mechanical strength.

The present invention is specifically directed toward proposing novel cation-conducting or proton-conducting solid electrolytes, which have improved ion conductivity and electrochemical stability.

More particularly, the invention relates, according to a first of its aspects, to a compound comprising at least one species of formula (I):

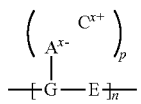

in which:
- $A^{x-}$ is an anion of valency x equal to 1 or 2 chosen from sulfonate, sulfonylimide of $-SO_2-N^--SO_2C_yF_{2y+1}$ type with y being an integer between 0 and 4; borate, borane, phosphate, phosphinate, phosphonate, silicate, carbonate, sulfide, selenate, nitrate and perchlorate anions;
- $C^{x+}$ is a counter-cation of the anion $A^{x-}$, chosen from a proton $H^+$ and alkali metal and alkaline-earth metal cations;
- p is an integer ranging from 1 to 10, preferentially from 1 to 4;
- E is an organic spacer comprising a linear sequence of at least two covalent bonds, in particular of at least three covalent bonds and more particularly of at least four covalent bonds;
- n is an integer greater than or equal to 2, in particular ranging from 2 to 1800; and
- G represents:
  (a) a group

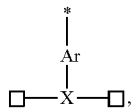

in which:
  X represents N, P or Si—R, with R representing a hydrogen atom or a $C_{1-4}$-alkyl group,
  Ar represents a polycyclic group formed from 2 to 6 rings, at least one of which is aromatic, each ring being, independently of each other, 4- to 6-membered, said polycyclic group possibly including up to 18 heteroatoms, chosen in particular from S, N and O;
  -□ represents a bond with the spacer E; and
  -* represents one or more bonds with said anions $A^{x-}$;
or (b) a group

in which:
  $X_1$ and $X_2$, which may be identical or different, represent NR, O or S, with R representing a hydrogen atom or a $C_{1-4}$-alkyl group; in particular, $X_1$ and $X_2$ both represent NH or O;
  -□ represents a bond with the spacer E; and
  -* represents one or more bonds with said anions $A^{x-}$;
  Ar is as defined previously;
  said anion(s) $A^{x-}$ being covalently bonded to the polycyclic group Ar.

As illustrated in the examples that follow, the inventors have shown that these compounds are proton-conducting or cation-conducting in their organized state.

The term "organized state" means an organization, in the solid state, of the compound according to the invention. This organized state may also be termed a set state or a reduced-mobility state of the molecules among each other. Without wishing to be bound by theory, the polycyclic groups of the compounds according to the invention become organized relative to each other to form "leaflets" spaced apart by the spacer chains.

This organized state may be more specifically characterized by x-ray or neutron spectroscopy, in which Bragg peaks and/or broad peaks are observable in a wave vector range extending from $10^{-4}$ to 6 Å$^{-1}$. The breadth of these peaks depends on the size of the crystallites and on the range of the correlations, of the lattice parameter gradients, not taking into account the instrumental resolution of the machine.

Various organizational states are possible as a function of the working temperature. The organized state also corresponds to the state of the compound that is thermodynamically the most stable at a given temperature below its melting point or decomposition temperature.

According to a particular embodiment, the organized state may be a crystalline state of the compounds according to the invention.

As detailed in the rest of the text, this organizational state may be obtained via conventional "solvent-route" techniques (for example by controlled evaporation of the solvent) or via "melt-route" techniques (for example by extrusion).

Thus, according to another of its aspects, the invention relates to the use of a compound comprising at least one species of formula (I) as defined previously, in the organized state, as solid electrolyte in an electrochemical system.

The invention also relates to a solid electrolyte comprising, or even being formed from, one or more compounds comprising at least one species of formula (I) as defined previously, in the organized state.

The term "solid electrolyte" means an electrolyte excluding the presence of a component in liquid form, and acting both as separator and as ion conductor in an electrochemical system.

The compounds according to the invention may be used as solid electrolytes in numerous electrochemical systems, such as generators, for example lithium batteries, or electrochemical conversion systems, for example proton-exchange-membrane fuel cells (PEMFC).

The use of the compounds according to the invention as solid electrolytes proves to be advantageous in many respects.

Firstly, since these compounds are conductive in a solid state, in particular a crystalline state, they have a greatly broadened working temperature as solid electrolyte.

An electrochemical system, for example a lithium battery, made with a solid electrolyte according to the invention may thus function over a wide temperature range, preferably between −40° C. and 200° C. and more preferentially between −20° C. and 200° C.

Moreover, the ion conductivity of a solid electrolyte according to the invention is based on a "direct" conduction mechanism, by "hopping" of the $C^{x+}$ cations from one polycyclic Ar group to another, and not via an assisted mechanism as is the case, for example, for the polymer electrolytes proposed by Cohen et al. Molecular Transport in Liquids and Glasses, J. Chem. Phys. 31, 1164 (1959).

A solid electrolyte according to the invention thus leads to improved performance in terms of ion conductivity.

Moreover, as mentioned previously, in addition to ensuring the passage of ions from one electrode to the other, the solid electrolyte according to the invention also acts as a separator which electronically insulates the two electrodes of the electrochemical system.

Finally, as detailed in the continuation of the text, the solid electrolyte according to the invention may also be incorporated into the composition of a composite electrode for an electrochemical system, for example the positive electrode of a lithium battery.

Other characteristics, variants and advantages of the compounds and solid electrolytes according to the invention, the preparation thereof and the use thereof will emerge more clearly on reading the description, examples and figures which will follow, given by way of illustration and without limitation of the invention.

In the continuation of the text, the expressions "between . . . and . . . ", "ranging from . . . to . . ." and "varying from . . . to . . ." are equivalent and are intended to mean that the limits are included, unless otherwise mentioned.

Unless otherwise indicated, the expression "comprising a(n)" should be understood as meaning "comprising at least one".

Compounds of the Invention

As mentioned previously, the compounds according to the invention comprise at least one species of formula (I) below:

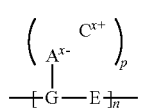
(I)

in which:
- $A^{x-}$ is an anion of valency x equal to 1 or 2 chosen from sulfonate, sulfonylimide of $-SO_2-N^--SO_2C_yF_{2y+1}$ type with y being an integer between 0 and 4 (for example equal to 1); borate, borane, phosphate, phosphinate, phosphonate, silicate, carbonate, sulfide, selenate, nitrate and perchlorate anions;
- $C^{x+}$ is a counter-cation of the anion $A^{x-}$, chosen from a proton $H^+$ and alkali metal and alkaline-earth metal cations, in particular the $Li^+$ cation;
- p is an integer ranging from 1 to 10, preferentially from 1 to 4 and especially equal to 1;
- E is an organic spacer comprising a linear sequence of at least two covalent bonds, in particular of at least three covalent bonds and more particularly of at least four covalent bonds;
- n is an integer greater than or equal to 2, in particular ranging from 2 to 1800; and
- G represents:
  (a) a group

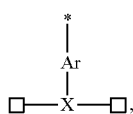

in which:
- X represents N, P or Si—R, with R representing a hydrogen atom or a $C_{1-4}$-alkyl group,
- Ar represents a polycyclic group formed from 2 to 6 rings, at least one of which is aromatic, each ring being, independently of each other, 4- to 6-membered, said polycyclic group possibly including up to 18 heteroatoms, chosen in particular from S, N and O;
- -□ represents a bond with the spacer E; and
- -* represents one or more bonds with said anions $A^{x-}$;

or (b) a group

in which:
- $X_1$ and $X_2$, which may be identical or different, represent NR, O or S, with R representing a hydrogen atom or a $C_{1-4}$-alkyl group; in particular, $X_1$ and $X_2$ both represent NH or O;
- -□ represents a bond with the spacer E; and
- -* represents one or more bonds with said anions $A^{x-}$;
- Ar is as defined previously;

said anion(s) $A^{x-}$ being covalently bonded to the polycyclic group Ar.

In the context of the invention, the following definitions apply:

"$C_{t-z}$" in which t and z are integers: a carbon-based chain which may contain from t to z carbon atoms; for example, $C_{1-4}$ a carbon-based chain which may contain from 1 to 4 carbon atoms;

"alkyl": a saturated, linear or branched aliphatic group; for example, a $C_{1-4}$-alkyl group represents a linear or branched carbon-based chain of 1 to 4 carbon atoms, and more particularly a methyl, ethyl, propyl, isopropyl, butyl, isobutyl or tert-butyl;

"4- to 6-membered aromatic or nonaromatic (hetero) cycle": an unsaturated, partially saturated or saturated, 4-, 5- or 6-membered cyclic group, optionally comprising one or more heteroatoms, chosen in particular from oxygen, sulfur and nitrogen. An aromatic ring may especially be benzene;

"polycyclic group": a group containing two or more aromatic nuclei (rings), condensed (ortho-condensed or ortho- and peri-condensed) on each other, i.e. having, in pairs, at least two carbons in common.

In particular, a polycyclic group according to the invention is formed from two to six rings, the rings being, independently of each other, 4- to 6-membered.

The polycyclic group may include one or more heteroatoms. It is then referred to as a "polyheterocyclic group".

"alkali metals": the chemical elements in the first column of the Periodic Table of the Elements, chosen more particularly from lithium, sodium, potassium, rubidium and cesium. Preferably, the alkali metal is lithium, sodium or potassium, and more preferentially lithium;

"alkaline-earth metals": the chemical elements in the second column of the Periodic Table of the Elements, more particularly chosen from beryllium, magnesium, calcium, strontium, barium and radium. Preferably, the alkaline-earth metal is magnesium or potassium.

In the definition of the organic spacer E, it is understood that the expression "linear sequence" is opposed to a "cyclic" sequence (for example in a benzene structure). E thus comprises a linear (non-cyclic) chain of at least two covalent bonds, for example two carbon-carbon bonds, in particular at least three covalent bonds.

Preferably, n in the abovementioned formula (I) may be between 2 and 1500, in particular between 2 and 300.

According to a particular embodiment, the compound of the invention may be a (co)polymer comprising at least one species of formula (I) defined above.

In particular, a copolymer according to the invention may have different species of formula (I). It may be, for example, a block copolymer, the blocks differing by the nature of the group G, of the spacer E and/or of the anion $A^{x-}$.

According to a particularly preferred embodiment, the compounds according to the invention are polymers comprising, or even being formed from, monomer units of formula (I') below:

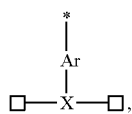
(I')

in which G, E, $A^{x-}$, $C^{x+}$ and p are as defined previously.

In particular, the monomer units of formula (I') may represent more than 60%, in particular more than 80% and more particularly more than 90% of the total weight of monomer units forming the polymer.

According to a particular embodiment, a polymer according to the invention is formed solely from monomer units of formula (I'). It may more particularly have a degree of polymerization (n) between 2 and 1500, in particular between 2 and 300.

According to a first implementation variant, the polycyclic groups Ar feature side groups on the main chain of the compound according to the invention.

In other words, the group G in formula (I) according to the invention represents a group

in which:
X represents N, P or Si—R, with R representing a hydrogen atom or a $C_{1-4}$-alkyl group; preferably, X represents N;
Ar represents a polycyclic group formed from 2 to 6 rings, at least one of which is aromatic, each ring being, independently of each other, 4- to 6-membered, said polycyclic group possibly including up to 18 heteroatoms, chosen in particular from S, N and O;
-□ represents a bond with the spacer E; and
-* represents one or more bonds with said anions $A^{x-}$;
said anion(s) $A^{x-}$ being covalently bonded to the polycyclic group Ar.

In particular, according to a particularly preferred embodiment, the compounds according to the invention are polymers comprising, or even being formed from, monomer units of formula (II) below:

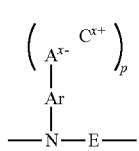
(II)

in which E, Ar, $A^{x-}$, $C^{x+}$ and p are as defined previously or described more specifically hereinbelow.

According to a second implementation variant, the polycyclic groups Ar are integrated in the main chain of the compound according to the invention.

In other words, the group G in formula (I) according to the invention represents a group

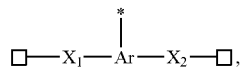

in which:
$X_1$ and $X_2$, which may be identical or different, represent NR, O or S, with R representing a hydrogen atom or a $C_{1-4}$-alkyl group; in particular, $X_1$ and $X_2$ both represent NH or O;
Ar represents a polycyclic group formed from 2 to 6 rings, at least one of which is aromatic, each ring being, independently of each other, 4- to 6-membered, said polycyclic group possibly including up to 18 heteroatoms, chosen in particular from S, N and O;
-□ represents a bond with the spacer E; and
-* represents one or more bonds with said anions $A^{x-}$;
said anion(s) $A^{x-}$ being covalently bonded to the polycyclic group Ar.

Preferably, Ar is a polycyclic group comprising from 2 to 4 rings, in particular with at least one of the rings being aromatic.

According to one variant, Ar is an aromatic polycyclic group formed from 2 to 6 aromatic rings.

More particularly, Ar may have one of the following polycyclic backbones:

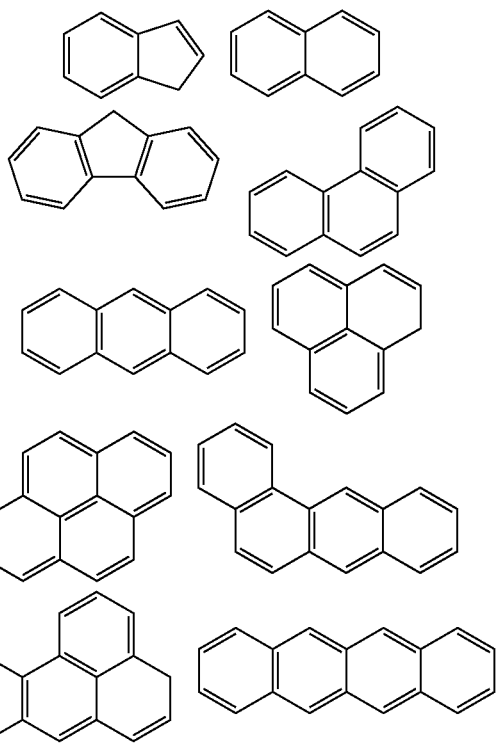

-continued

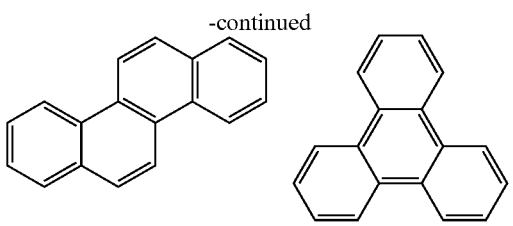

It is understood that the group Ar may be a polyheterocyclic group having one of the backbones presented above in which one or more carbon atoms are replaced with one or more heteroatoms, chosen especially from S, N and O.

According to a particular embodiment, Ar is an aromatic bicyclic group, in particular with a naphthalene aromatic backbone.

Preferably, Ar is a naphthalene group.

Thus, according to a particularly preferred embodiment, the compounds according to the invention are polymers comprising, or even being formed from, monomer units of formula (III) below:

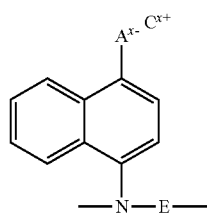

(III)

in which E, $A^{x-}$ and $C^{x+}$ are as defined above or detailed below.

As indicated previously, E in the abovementioned formula (I) (in particular in the abovementioned formula (I'), (II) or (III)) represents an organic spacer comprising a linear sequence of at least two covalent bonds, in particular of at least three covalent bonds and more particularly of at least four covalent bonds.

Advantageously, this spacer ensures, during the use of the compound according to the invention for forming a solid electrolyte, the arrangement of the polycyclic groups Ar relative to each other to achieve a proton-conducting or cation-conducting organized state.

This organic spacer may be of diverse nature.

Preferably, the organic spacer E is a linear or branched, saturated or unsaturated aliphatic chain, containing at least two double bonds, said chain being optionally interrupted with one or more heteroatoms, in particular S, O or N, with one or more metalloids, for example silicon, and/or with one or more aromatic or nonaromatic, 4-to 6-membered (hetero) cycles; said chain being optionally substituted with one or more fluorine atoms and/or with one or more groups $R_1$, $R_1$ representing a group chosen from a hydroxyl group, optionally in protonated form $—O^-C^+$; an $—NH_2$ group and an oxo group.

In particular, $R_1$ is a hydroxyl group, optionally in deprotonated form $—O^-C^+$.

As illustrated in the examples that follow, the substituent groups on the aliphatic chain, $R_1$, may especially result from nucleophilic substitution or addition reactions performed for the synthesis of the compound according to the invention.

The use of a fluoro chain advantageously gives the spacer great flexibility and thus makes it possible to obtain organizational states of the compound according to the invention even at very low temperature (for example between −80° C. and −60° C.). Moreover, fluorine has very good electrochemical stability.

Preferably, the organic spacer E may represent a saturated linear $C_4$ to $C_{20}$ aliphatic chain, said chain being optionally interrupted with one or more heteroatoms, in particular one or more oxygen atoms, and/or with one or more aromatic or nonaromatic 4-to 6-membered rings, in particular one or more benzene rings, said chain being optionally substituted with one or more hydroxyl groups, preferably in protonated form $—O^-C^+$.

Advantageously, the hydroxyl functions of the organic spacer E of the compound according to the invention are protonated ($—O^-C^+$), prior to its use as a solid electrolyte, as detailed in the continuation of the text, so that the hydroxyl side functions do not immobilize $C^+$ cations during the functioning of the electrochemical system, which might be prejudicial to the ion conductivity of the solid electrolyte. Thus, the $C^+$ cations immobilized on the spacer do not participate in the charge transfer.

In the abovementioned formula (I) (in particular formula (I'), (II) or (III)), the anion $A^{x-}$ may be chosen more particularly from sulfonate ($SO_3^-$) and trifluoromethylsulfonylimide (TFSI) anions.

Preferably, $A^{x-}$ is a sulfonate anion.

According to one implementation variant of the invention, $C^{x+}$ represents a proton $H^+$. As detailed in the continuation of the text, such compounds may be advantageously used as solid electrolyte in a lithium battery.

According to another implementation variant of the invention, $C^{x+}$ represents the $Li^-$ cation. As detailed in the continuation of the text, such compounds may be advantageously used as a solid electrolyte in a proton-exchange-membrane fuel cell (PEMFC) or a low-temperature electrolyzer.

It is understood that the definitions given above for G, E, n, $A^{x-}$ and $C^{x+}$ may be combined, as far as is possible, to define other particular embodiments.

Thus, as examples of compounds in accordance with the invention, mention may be made more particularly of polymers comprising, in particular constituted of, monomer units of formula (IV) below:

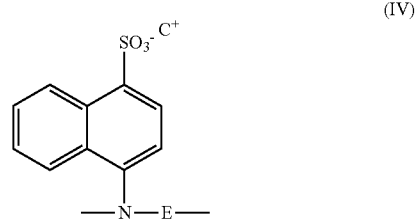

(IV)

in which E and $C^{x+}$ are as defined according to any one of the definitions presented above.

Preparation of the Compounds of the Invention

The compounds according to the invention may be prepared using nucleophilic addition or substitution methods known to those skilled in the art, as detailed below.

According to a first implementation variant, the compounds of the invention, for which G represents (a) a group

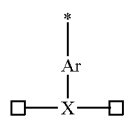

may be prepared according to a process comprising at least the placing in contact of a compound having the structure (a-i) below

in which Nu represents a difunctional nucleophilic function, in particular an —$NH_2$, —$PH_2$ or —$SiRH_2$ function with R representing a hydrogen atom or a $C_{1-4}$-alkyl group, with a precursor of the spacer E, bearing two identical electrophilic functions, chosen in particular from epoxide, halogen, isocyanate, nitrile, thiocarbonyl and carbonyl functions, under conditions suitable for their interaction in a nucleophilic addition or substitution reaction.

By way of example, the polymers according to the invention bearing monomer units of the abovementioned formula (II) may be obtained via a nucleophilic addition reaction between a compound of formula

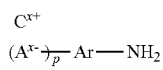

and a precursor the spacer E bearing two identical electrophilic functions, for example epoxide functions.

This first variant for the preparation of compounds in accordance with the invention is illustrated in the examples that follow.

As an alternative, it is also possible to perform the nucleophilic addition or substitution reaction between a compound comprising the polycyclic group bearing a difunctional electrophilic function, for example of anhydride type, and a precursor of the spacer E bearing two monofunctional nucleophilic functions.

Similarly, as regards the compounds of the invention, for which G represents (b) a group

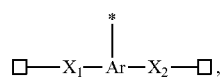

they may be prepared according to one implementation variant, via a process comprising at least one step of placing in contact a compound having the structure (b-i) below:

in which Nu', which may be identical or different, represent monofunctional nucleophilic functions chosen in particular from hydroxyl, thiol and secondary amine functions, with a precursor of the spacer E, bearing two identical electrophilic functions, chosen in particular from epoxide, halogen, isocyanate, nitrile, thiocarbonyl and carbonyl functions, under conditions suitable for their interaction in a nucleophilic addition or substitution reaction.

As an alternative, it is also possible to perform the nucleophilic addition or substitution reaction between a compound comprising the (poly)cyclic group bearing two electrophilic functions and a precursor of the spacer E bearing two identical or different monofunctional nucleophilic functions, chosen in particular from hydroxyl, thiol and secondary amine functions.

Needless to say, it falls to a person skilled in the art to adjust the synthetic conditions to obtain the compounds according to the invention.

Use as Solid Electrolyte

The compounds according to the invention may advantageously be used, in their organized state, as solid electrolytes, in particular in an electrochemical system, especially in a lithium battery.

Preparation of the Solid Electrolyte according to the Invention

As mentioned previously, the compounds of formula (I) according to the invention are proton or cation conductors in their organized state.

The organized state is more particularly a solid state. It may in particular be a crystalline state.

The solid electrolyte formed according to the invention may be in any suitable form, for example in the form of a sheet, a film or a membrane.

The solid electrolyte according to the invention has good ion conductivity properties.

According to one embodiment, the solid electrolyte according to the invention has an ion conductivity at 120° C. of greater than or equal to $10^{-9}$ S/cm, in particular between $10^{-8}$ and $5 \times 10^{-5}$ S/cm and especially between $10^{-8}$ and $10^{-5}$ S/cm.

Preferably, the solid electrolyte according to the invention has an ion conductivity at 200° C. of greater than or equal to $10^{-7}$ S/cm, in particular between $10^{-7}$ and $10^{-3}$ S/cm.

The solid electrolyte according to the invention, comprising one or more compounds of the invention described previously, in an organized state, may be prepared according to known techniques, via a "solvent" route (for example by controlled evaporation of the solvent) or via a "melt" route (for example by extrusion).

Needless to say, a person skilled in the art is capable of adjusting the method for preparing the solid electrolyte with regard to the electrochemical system in which it is intended to be used.

Thus, according to a first implementation variant, the solid electrolyte according to the invention may be obtained by controlled evaporation.

More precisely, a film (or layer) comprising at least one solid electrolyte according to the invention may be prepared on the surface of a substrate, according to a process comprising at least the steps consisting in:

(a1) having a solution comprising at least one compound according to the invention, in a polar solvent;

(b1) depositing said solution from step (a1) onto the surface of said substrate; and (c1) evaporating the solvent under conditions suitable for forming a film comprising at least one solid electrolyte formed from said compound of formula (I) in its organized state.

The polar solvent in step (a1) may be, for example, N,N-dimethylformamide (DMF), dimethylacetamide (DMAc), monoalcohols, especially methanol, or water.

A person skilled in the art is capable of adjusting the conditions for evaporating the solvent to obtain the desired organized state.

One or more subsequent steps of exposure of the film, formed after evaporation of the solvent, to an electric or magnetic field or to ionizing radiation, in particular photon radiation, may be performed, so as to promote the production of the desired organized state.

Preferably, the substrate on the surface of which is formed the film comprising the solid electrolyte according to the invention has the fewest possible surface defects, so as to allow an optimum organized state to be obtained, for example showing good crystallinity, of the compound according to the invention, which ensures optimum ion conductivity.

According to yet another implementation variant, a solid electrolyte film according to the invention, supported on a substrate or self-supported, may be obtained via a melt route, especially by extrusion.

Melt extrusion techniques are known to those skilled in the art.

More specifically, the process for preparing a solid electrolyte film may involve at least the steps consisting in:

(a2) having a powder formed from at least one compound according to the invention;

(b2) melt-extruding said powder in the form of a solid electrolyte film formed from said compound of formula (I) in its organized state; and (c2) spreading said electrolyte film optionally on the surface of a substrate.

As previously, one or more subsequent steps of exposure of the film to an electric or magnetic field or to ionizing radiation, in particular photon radiation, may be performed, so as to promote the production of the desired organized state.

The film comprising the solid electrolyte may have a thickness of between 5 and 50 µm, in particular about 5 µm.

Electrochemical System

The solid electrolyte according to the invention may be used in an electrochemical system, for example for a lithium battery.

The present invention thus relates, according to yet another of its aspects, to an electrochemical system comprising a solid electrolyte according to the invention.

The electrochemical system may be an electrochemical storage, converter or generator system.

It may more particularly be a fuel cell, for example a proton-exchange-membrane fuel cell (PEMFC); a primary or secondary battery, for example a lithium, sodium, magnesium, potassium or calcium battery; a lithium-air or lithium-sulfur accumulator.

According to a particular embodiment, the solid electrolyte is used in a battery, in particular a lithium battery.

Separating Electrolyte

An electrochemical system according to the invention generally comprises at least one positive electrode and one negative electrode, between which is a solid electrolyte film which acts as both ion conductor and separator between the positive and negative electrodes.

In the continuation of the text, the solid electrolyte layer according to the invention, intended to act as a separator between the positive and negative electrodes of an electrochemical system, will be referred to more simply as the "separating electrolyte".

The separating electrolyte may be formed, via one of the methods described previously, on the surface of a substrate constituted at least partly of an electrode of the electrochemical system.

The substrate may be formed, for example, from a multilayer stack comprising at least one current collector and an electrode that is suitable for making the electrochemical system, for example a composite electrode as described below, at the surface of which is formed the separating electrolyte.

The separating electrolyte according to the invention may have a thickness of between 5 and 50 µm, in particular about 5 µm.

The development of the desired electrochemical system incorporating the separating electrolyte according to the invention falls within the competence of a person skilled in the art. A person skilled in the art is thus capable of performing the conventional techniques, especially for the formation of a solid second layer intended to be used as electrode, at the surface of the solid electrolyte layer formed as described previously.

By way of example, a lithium accumulator may be formed, in a conventional manner, by two electrodes, namely a positive electrode and a negative electrode.

The positive electrode generally comprises, as electrochemically active material, lamellar compounds such as $LiCoO_2$, $LiNiO_2$ and mixed $Li(Ni, Co, Mn, Al)O_2$, or compounds of spinel structure or compositions similar to $LiMn_2O_4$, or lithium phosphates, in particular $LiFePO_4$.

The negative electrode generally comprises, as electrochemically active material, lithium metal in the case of primary accumulators, or intercalation materials such as graphite carbon, or lithiated titanium oxide ($Li_4Ti_5O_{12}$) in the case of accumulators based on the lithium-ion technology.

current collectors, generally made of copper for the negative electrode, or of aluminum for the positive electrode, which allow the circulation of electrons, and thus electron conduction, in the external circuit; and the separating electrolyte according to the invention in which takes place the ion conduction that ensures the passage of the lithium ions from one electrode to the other, and which also acts as separator, preventing contact between the positive and negative electrodes.

It may in particular be a lithium metal battery, comprising a lithium metal anode and a cathode comprising at least one positive electrode active material, between which is a solid electrolyte according to the invention.

Composite Electrode

At least one of the electrodes of the electrochemical system according to the invention, for example the positive electrode of a lithium battery, may also comprise a solid electrolyte according to the invention.

Such a composite electrode optimizes the solid electrolyte/electrode interface of the electrochemical system, insofar as the electrolyte of the invention cannot penetrate into the porous material of the electrode. Moreover, the use of a solid electrolyte in accordance with the invention in the composition of the cathode especially prevents the formation of a concentration gradient in the thickness of the cathode during cycling, and thus improves the power performance of the battery, or makes it possible to increase the basis weight of the cathode (i.e. the amount of positive electrode active material/$cm^2$/face).

Thus, according to yet another of its aspects, the present invention relates to a composite electrode comprising at least one solid electrolyte according to the invention.

The invention also relates to an electrochemical system comprising at least one such composite electrode.

In the particular case of a lithium metal battery, only the cathode can be a composite electrode.

In the other cases of batteries, the positive electrode and the negative electrode are preferably both composite electrodes.

A composite electrode according to the invention may more particularly be formed from a composite material comprising, in addition to the solid electrolyte according to the invention, one or more active materials, one or more conductive additives and optionally one or more binders.

The solid electrolyte of a composite electrode according to the invention may be obtained via a "solvent route" technique.

By way of example, a composite electrode that may be used, for example, as the positive electrode in a lithium accumulator may be formed via the following steps:

(a) preparation of a dispersion comprising, in one or more solvents, one or more compounds of the invention; one or more active materials, one or more conductive additives and optionally one or more binders.

As mentioned previously, the active materials for a positive composite electrode may be chosen from lithium intercalation materials such as lamellar oxides of lithiated transition metals, olivines (LiFePO$_4$), LiMn$_2$O$_4$, or spinels (for example spinel LiNi$_{0.5}$Mn$_{1.5}$O$_{(4)}$).

The electron-conducting additives may be chosen, for example, from carbon fibers, carbon black, carbon nanotubes, and the like.

The binders may be chosen from fluorinated binders, for example polytetrafluoroethylene, polyvinylidene fluoride (PVDF), polysaccharides or latices, especially such as styrene-butadiene rubber (SBR).

The dispersion, more commonly known as an "ink", may be homogenized before being spread, for example using a deflocculator at a speed of between 2 and 5000 rpm with deflocculating disk geometry. The value of the shear gradient may be between 10 and 2000 s$^{-1}$.

(b) spreading of the dispersion thus prepared onto the surface of a current collector, for example of aluminum, copper, nickel or iron type; and (c) evaporation of said solvent(s) to form the electrode film. The evaporation may be performed by drying, for example in an oven, at a temperature of between 50° C. and 120° C., in particular about 80° C., for a time of between 1 hour and 24 hours.

The composite electrode may more particularly comprise from 30% to 60% by weight of solid electrolyte according to the invention, in particular about 40% by weight of solid electrolyte, relative to the total weight of the electrode.

The rest of the composite electrode may more particularly be formed from 80 to 95% of active material(s) and from 0 to 1% of conductive additive(s).

The composite electrode according to the invention may have a thickness of between 20 μm and 400 μm, in particular between 100 μm and 250 μm.

According to another of its aspects, the invention also relates to an electrochemical system comprising:

a solid electrolyte film (separating electrolyte) as described previously, acting as both ion conductor and separator between the positive and negative electrodes, and at least one composite electrode (the positive electrode and/or the negative electrode) as described previously.

The invention will now be described by means of the examples and figures that follow, which are obviously given as nonlimiting illustrations of the invention.

FIGURES

Figure 2:
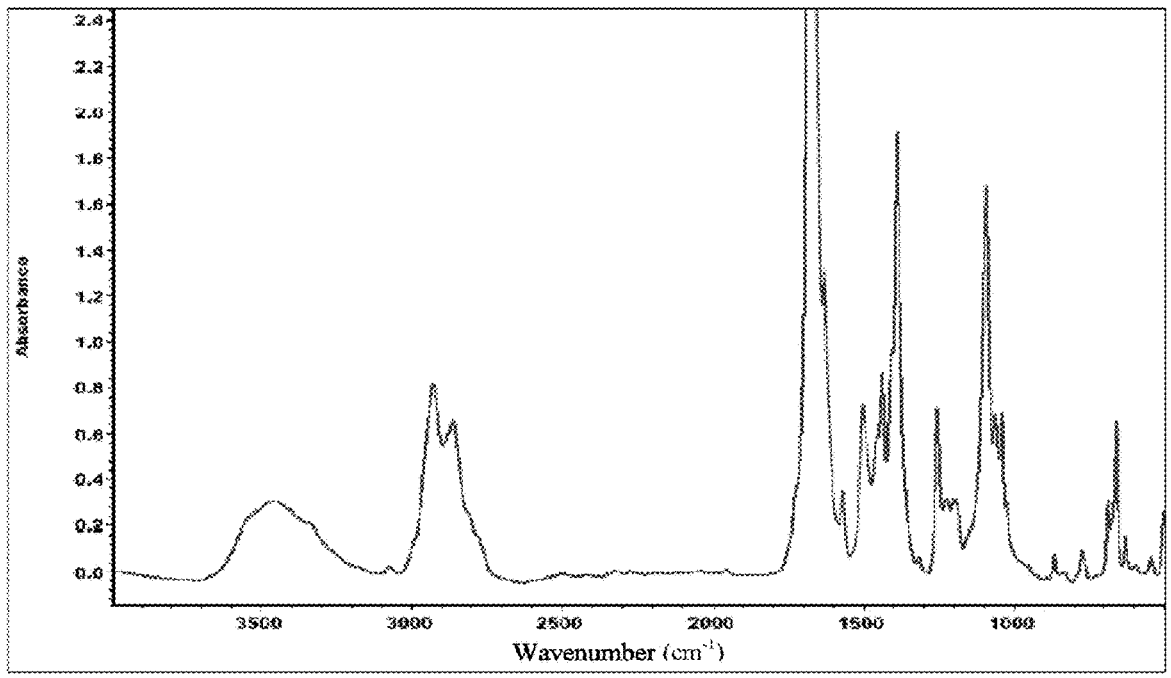
Figure 3:
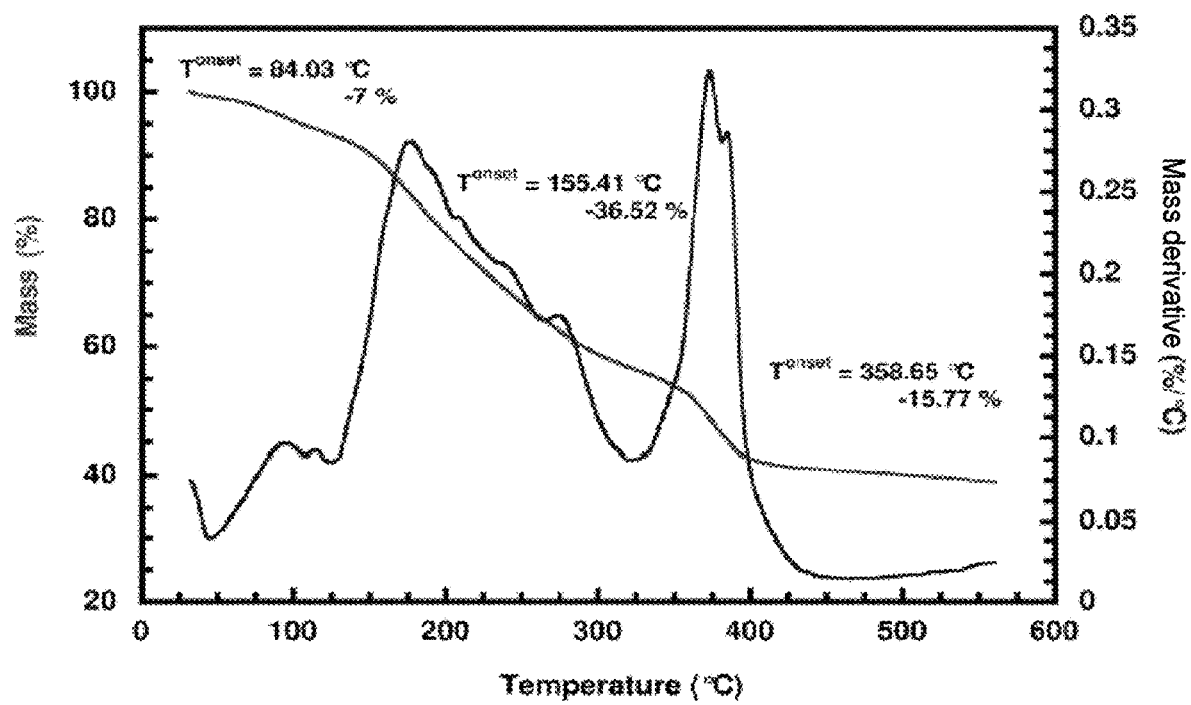
Figure 4:
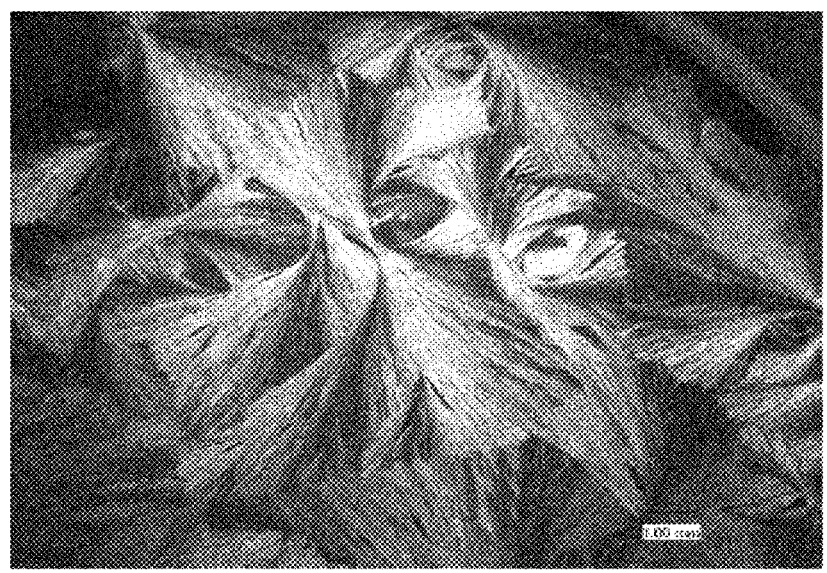
Figure 5:
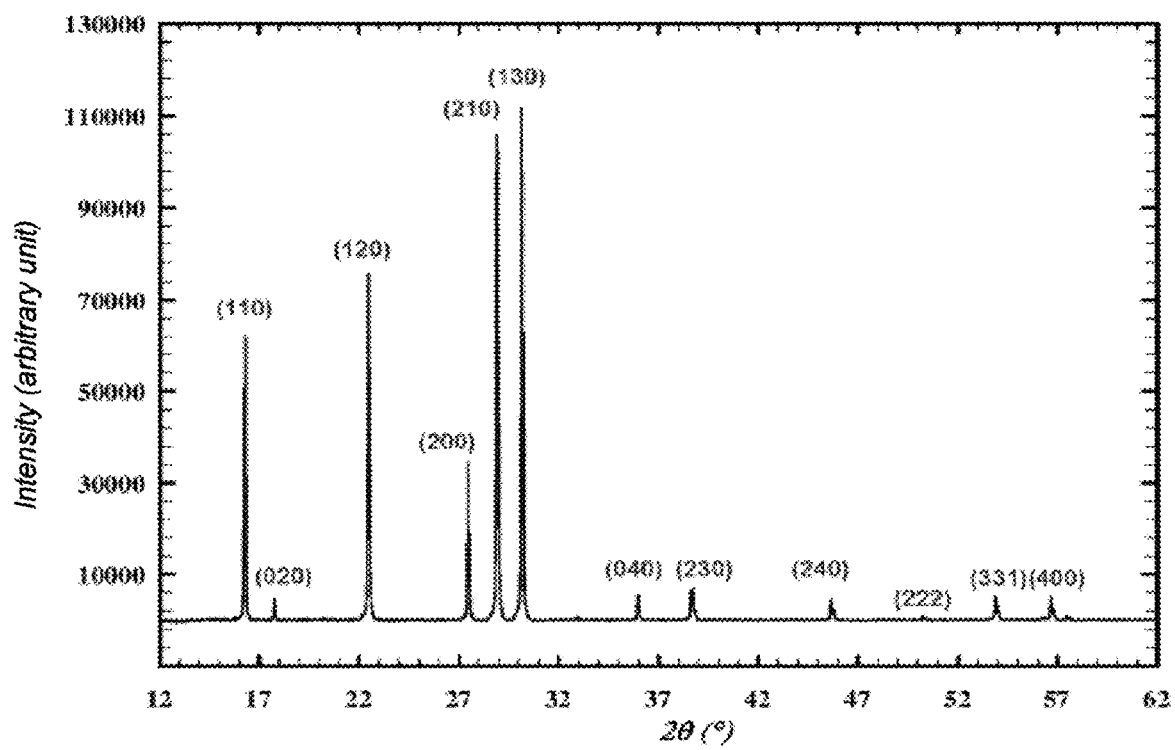
Figure 6:
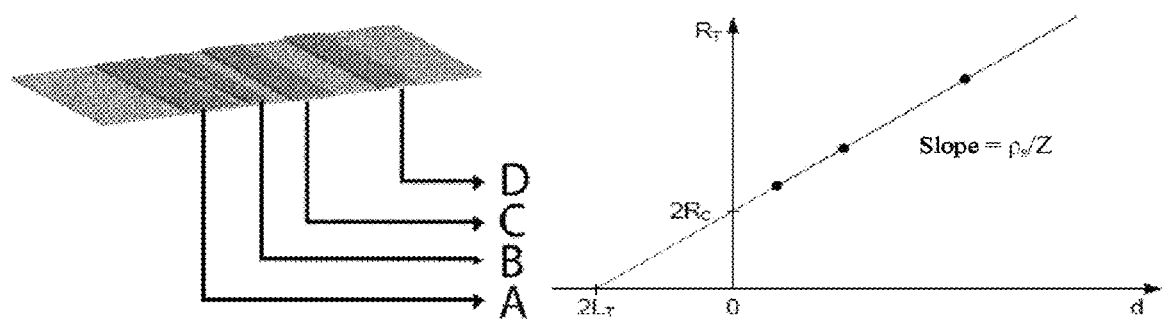
Figure 7:
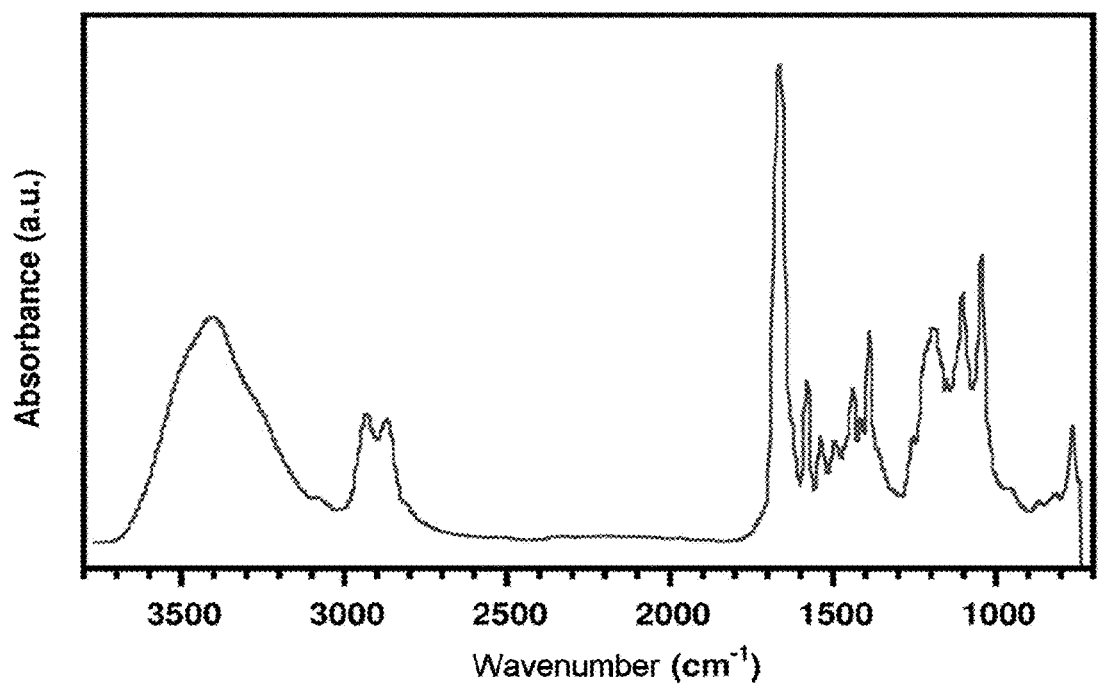
Figure 8:
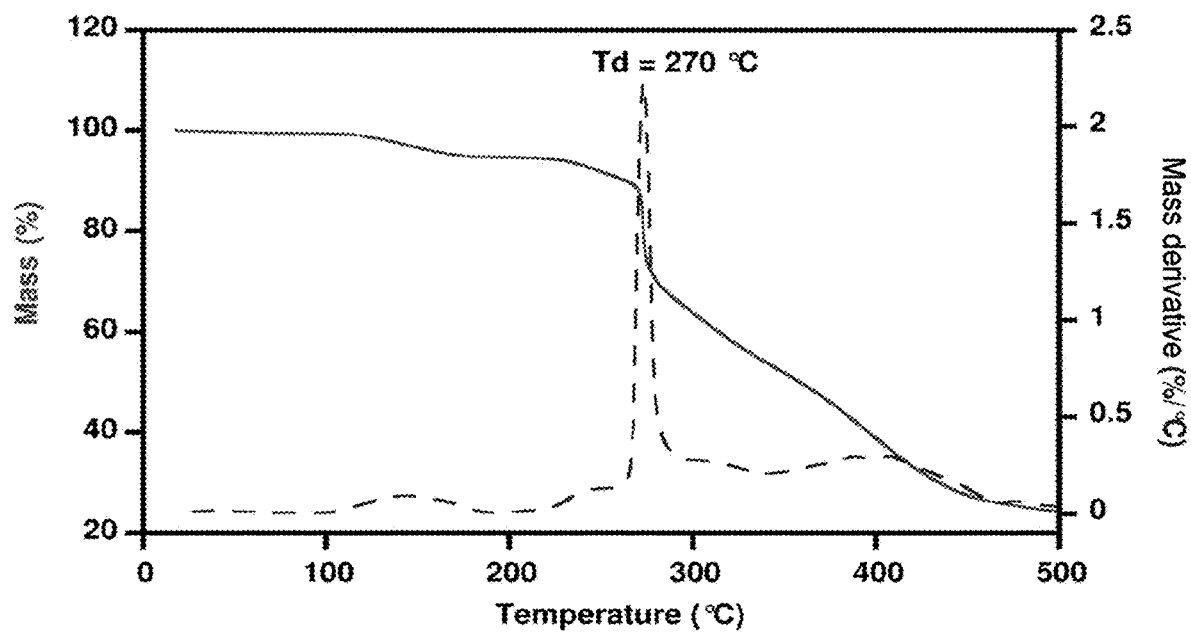
Figure 9:
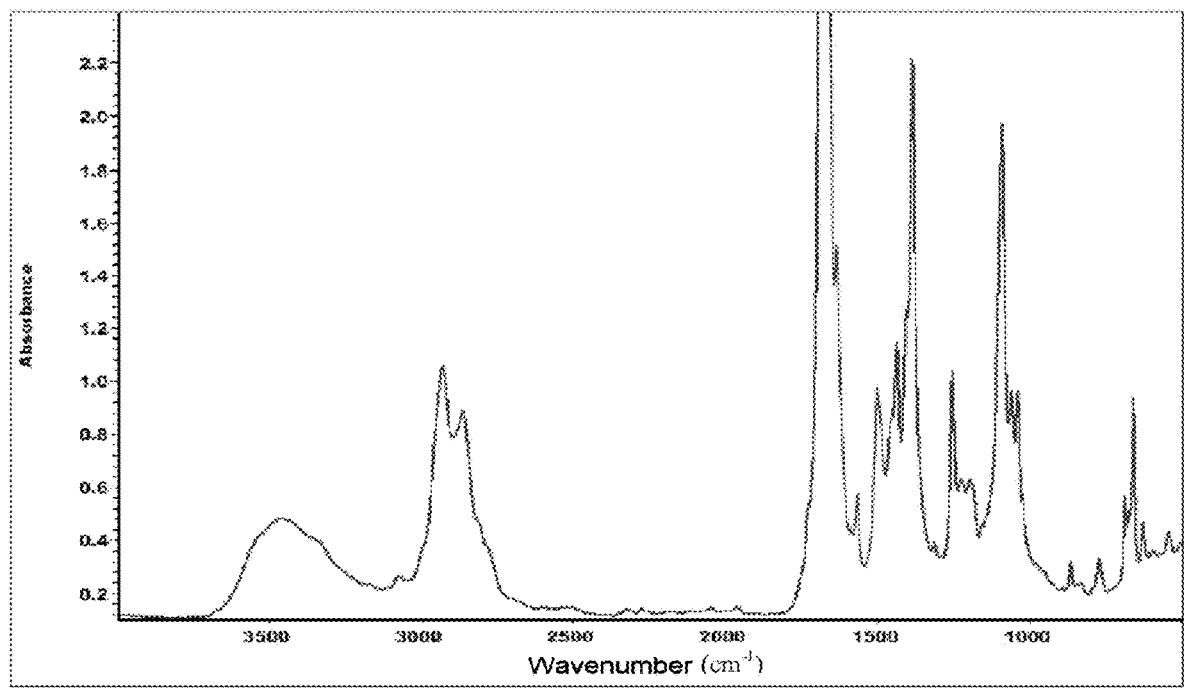
Figure 10:
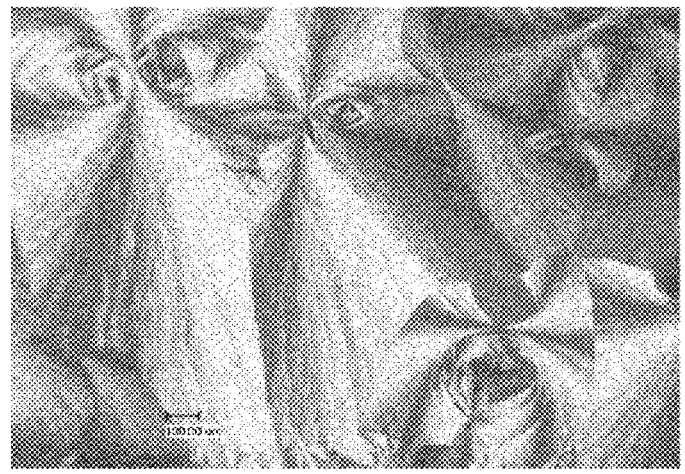
Figure 11:
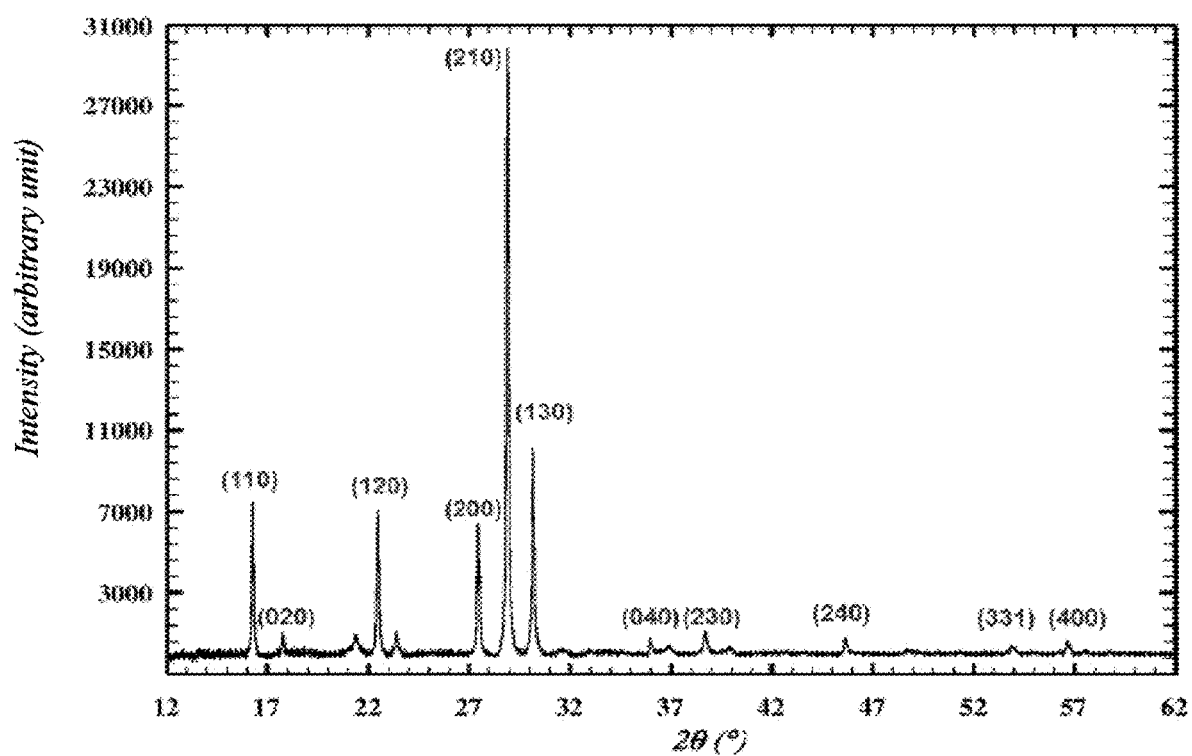
Figure 12:
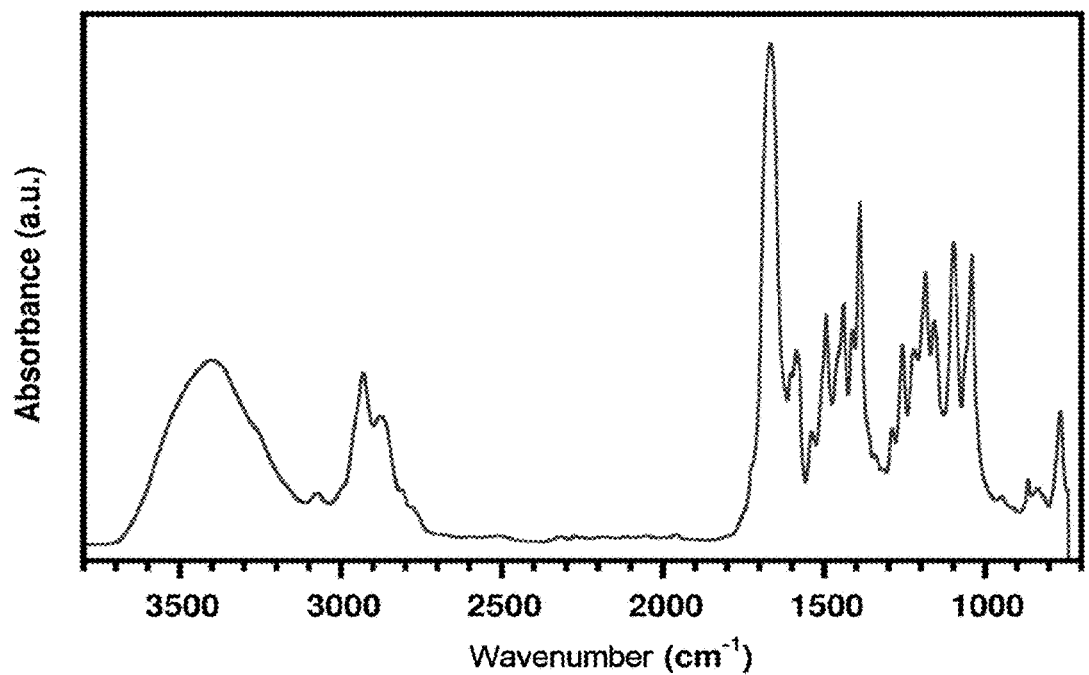
Figure 13:
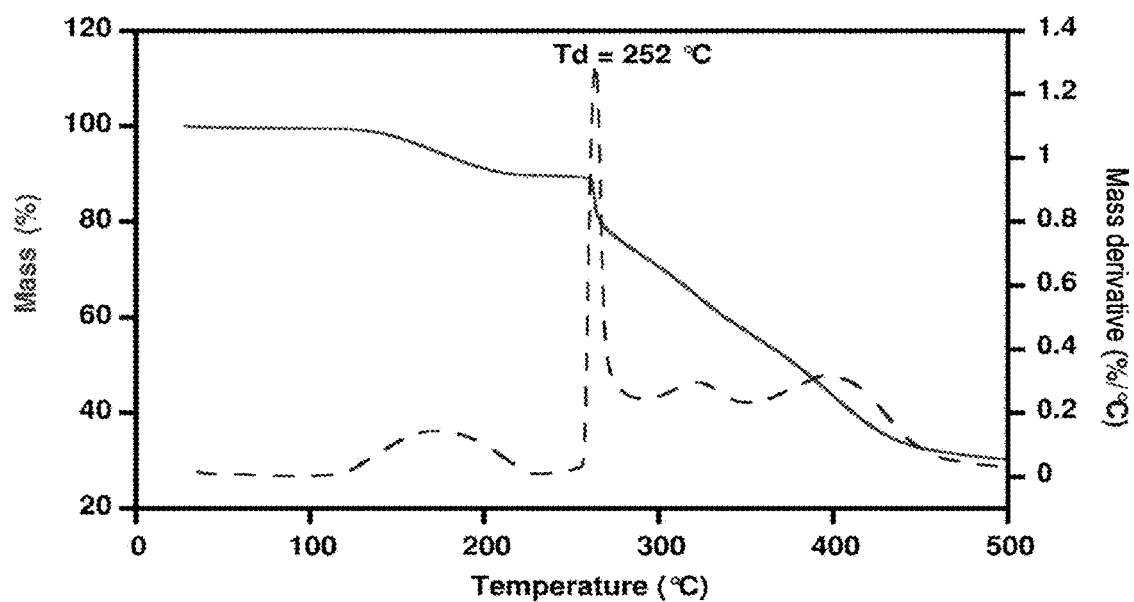
Figure 14:
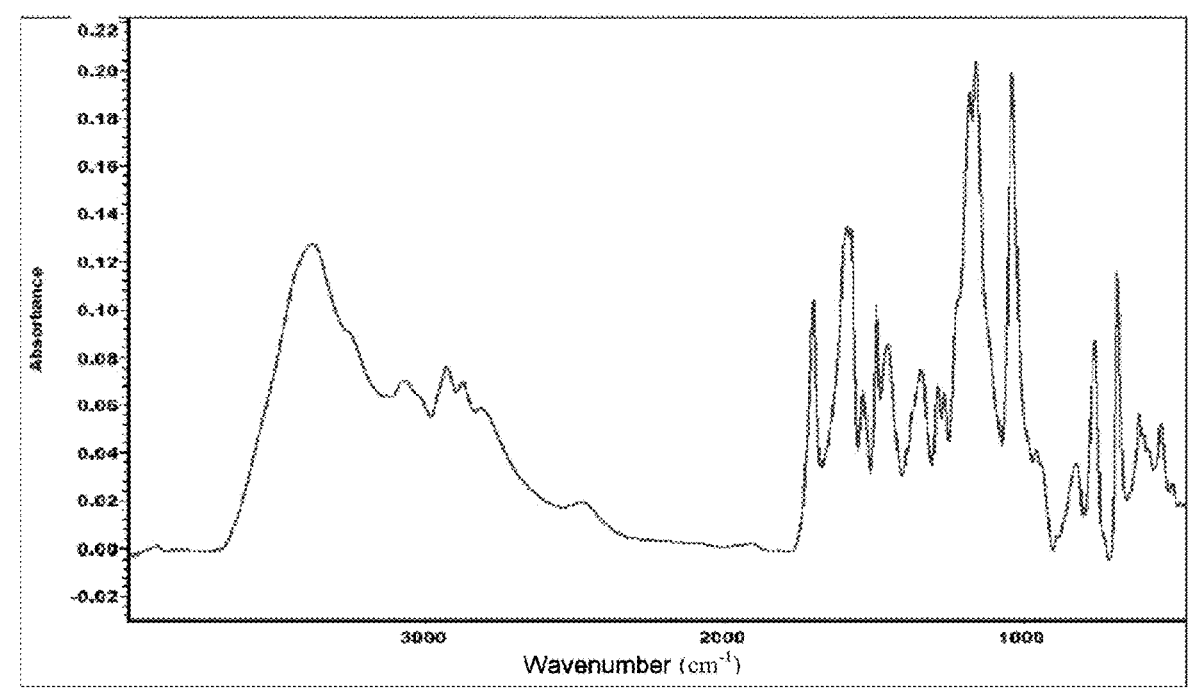
Figure 15:
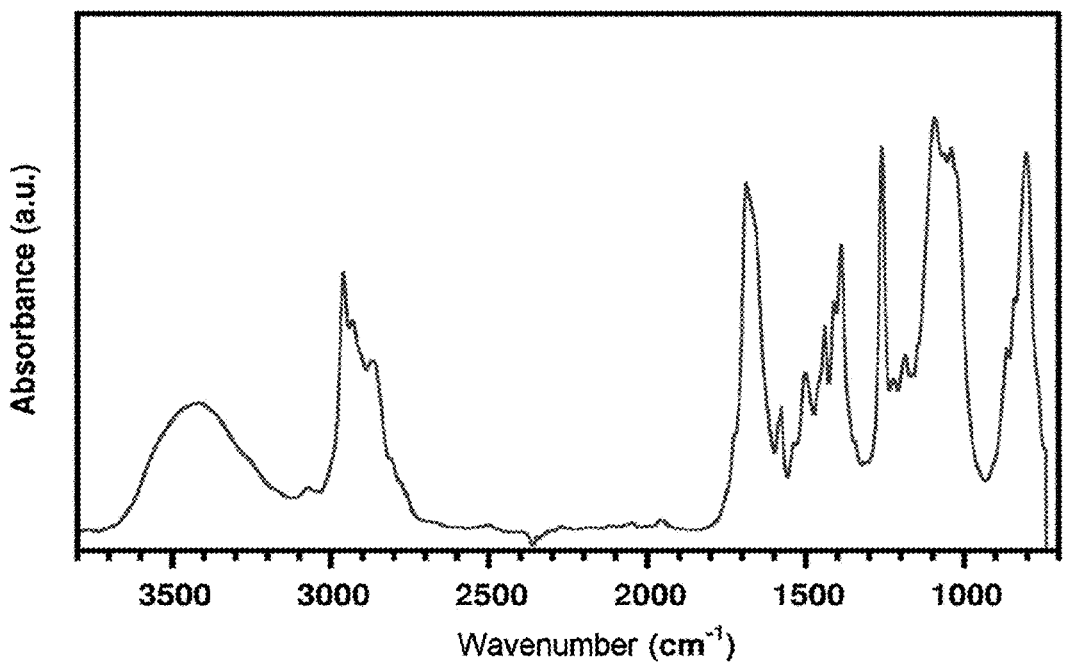
Figure 16:
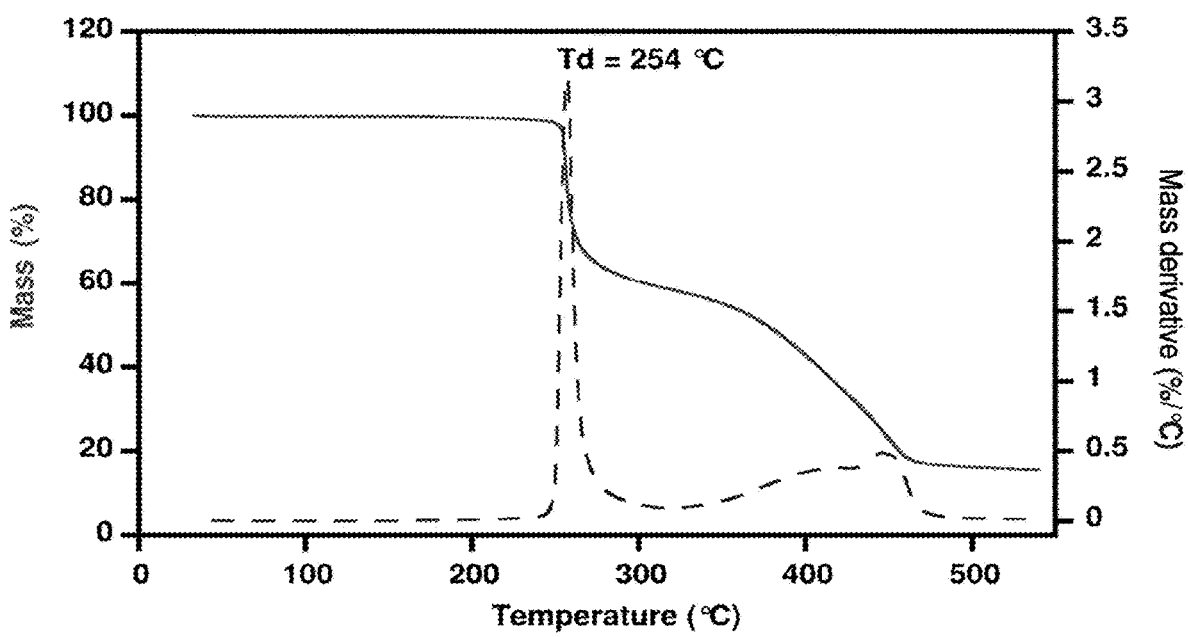
Figure 17:
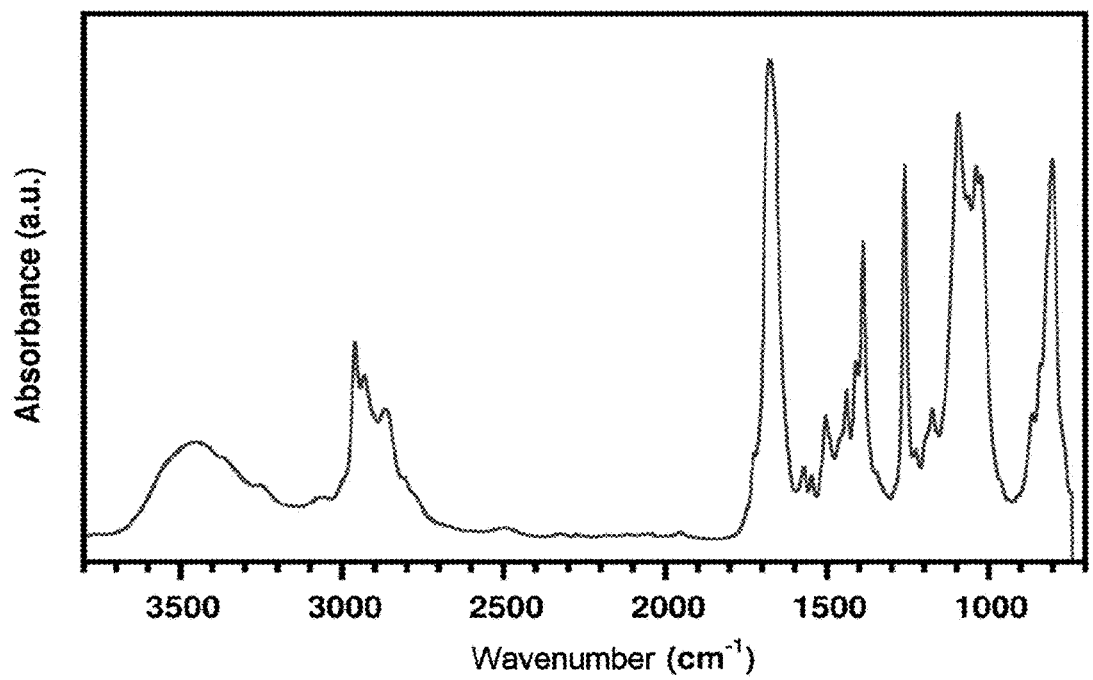
Figure 18:
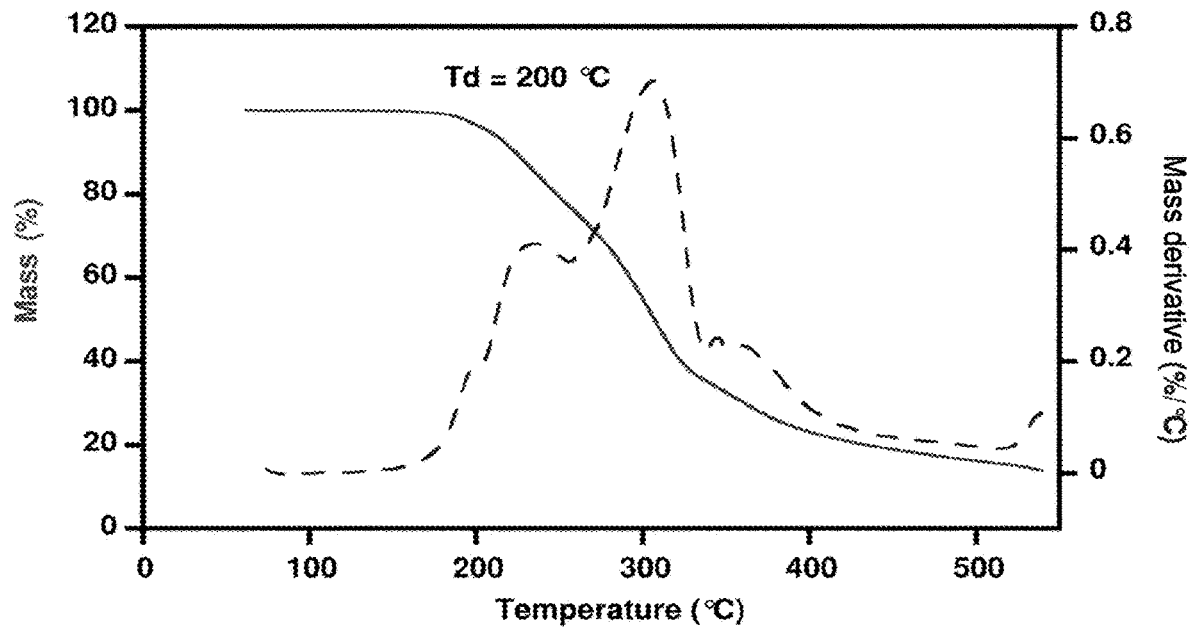
Figure 19:
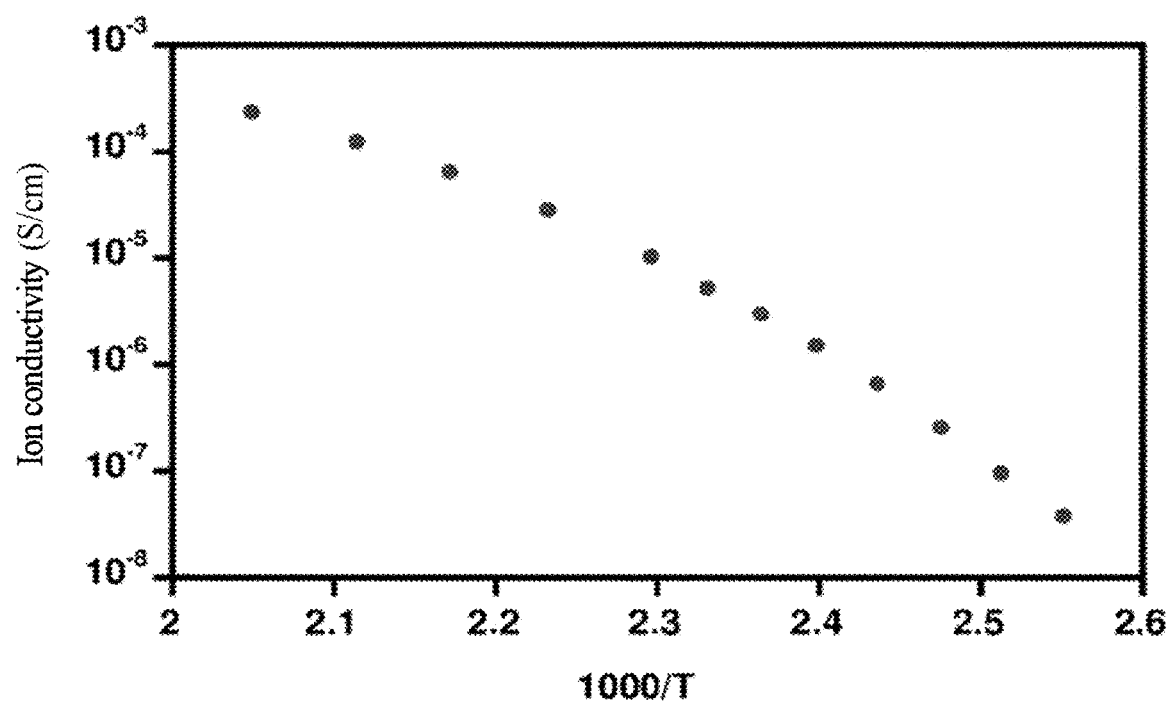
Figure 20:
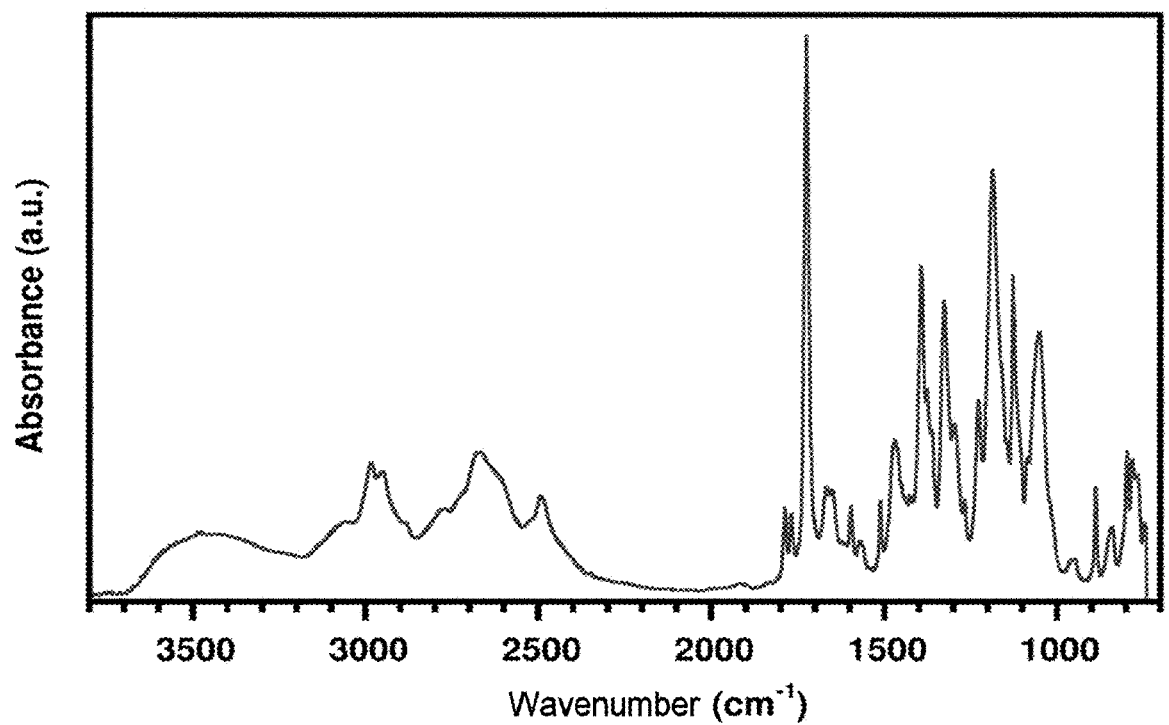
Figure 21:
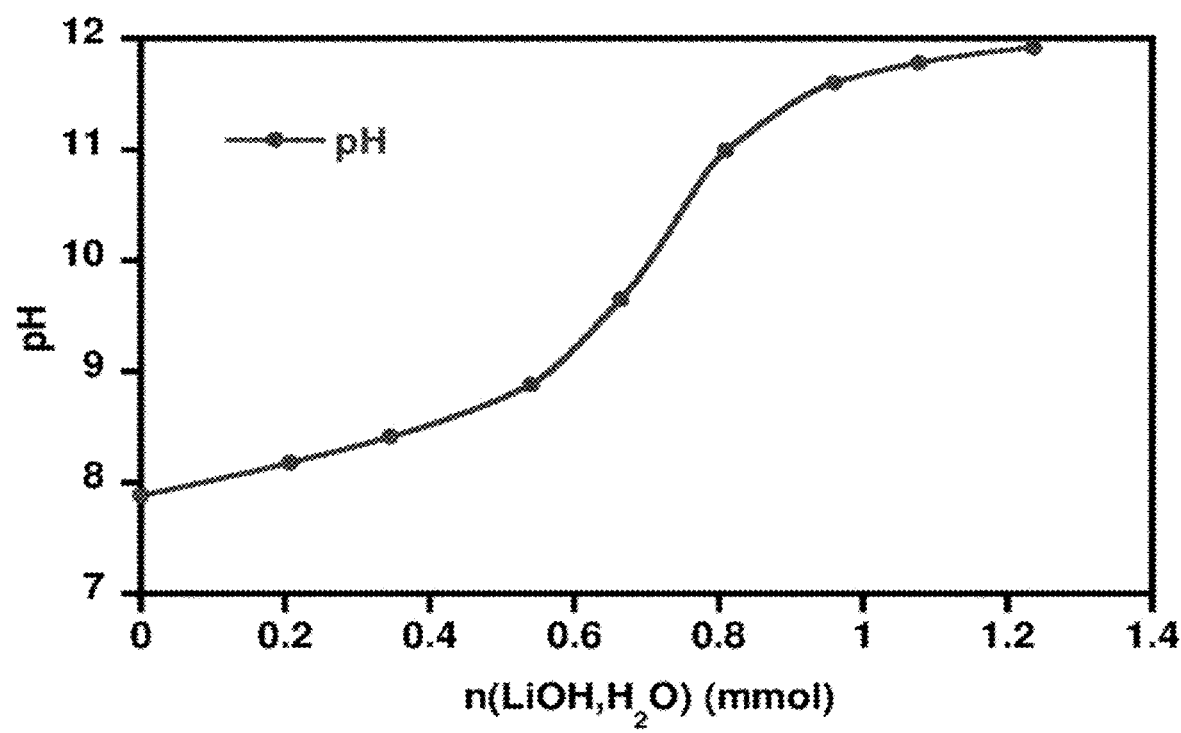
Figure 22:
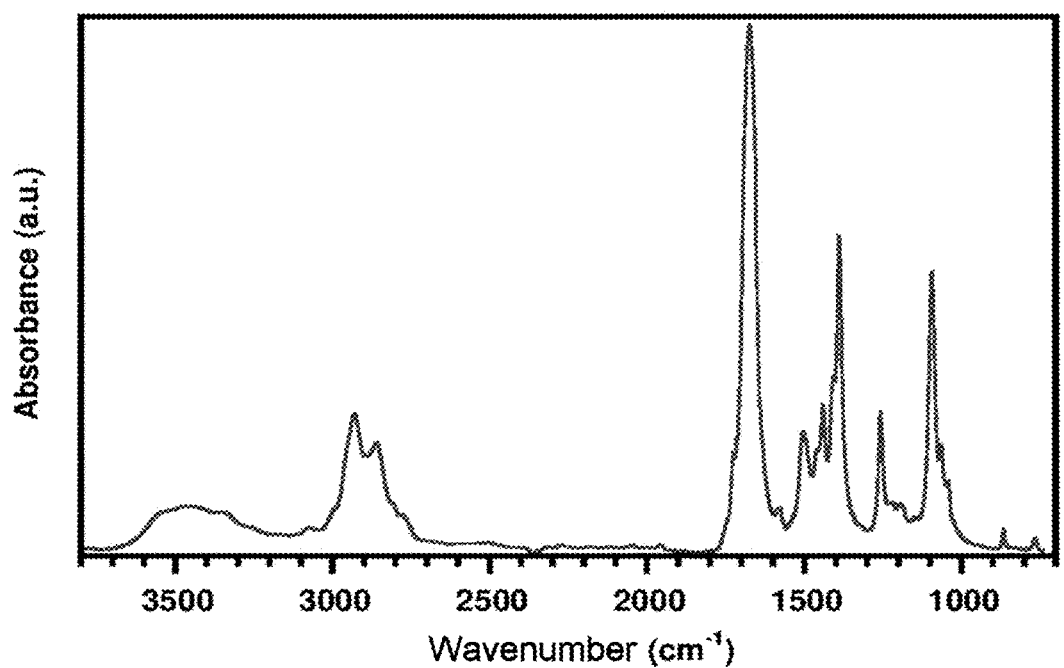
Figure 23:
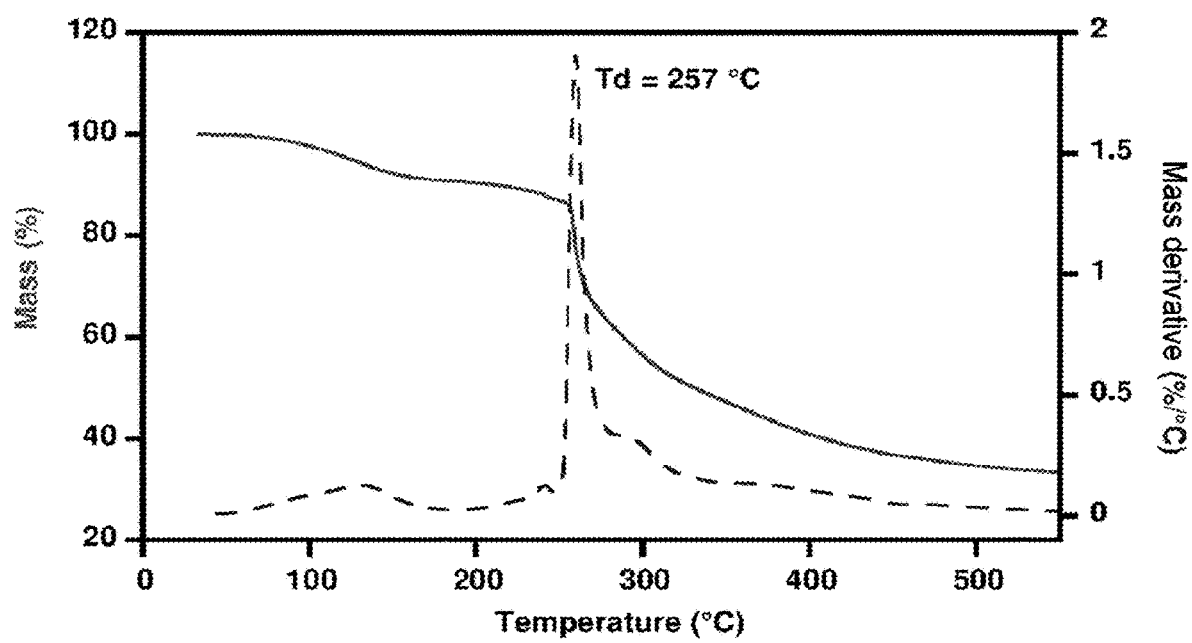
Figure 24:
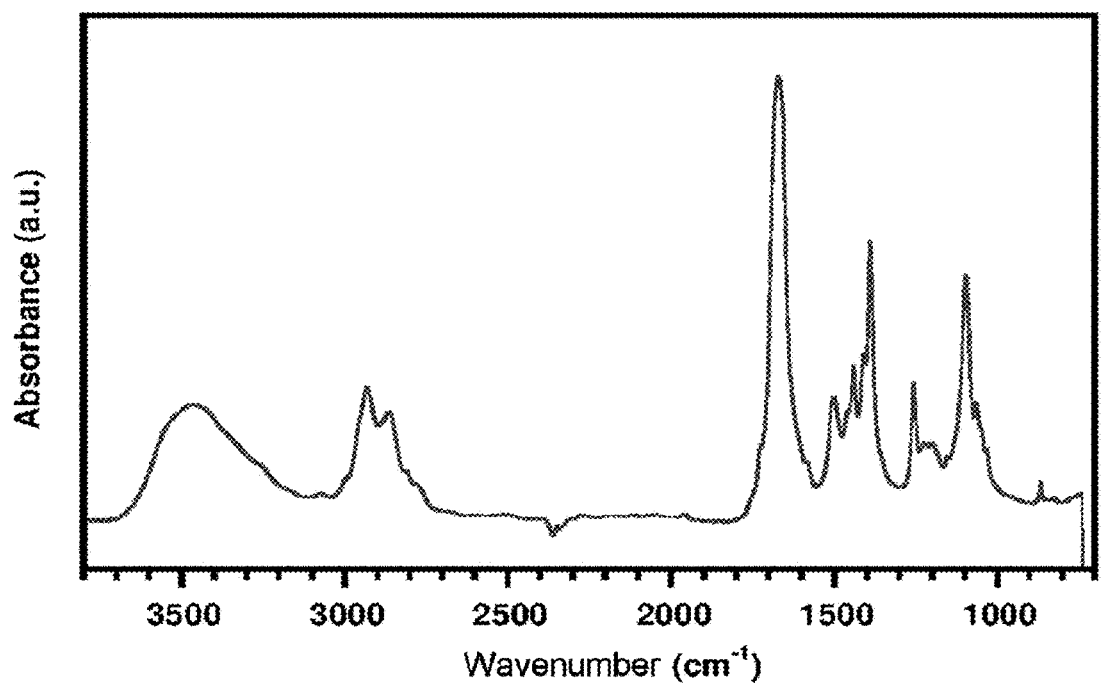
Figure 25:
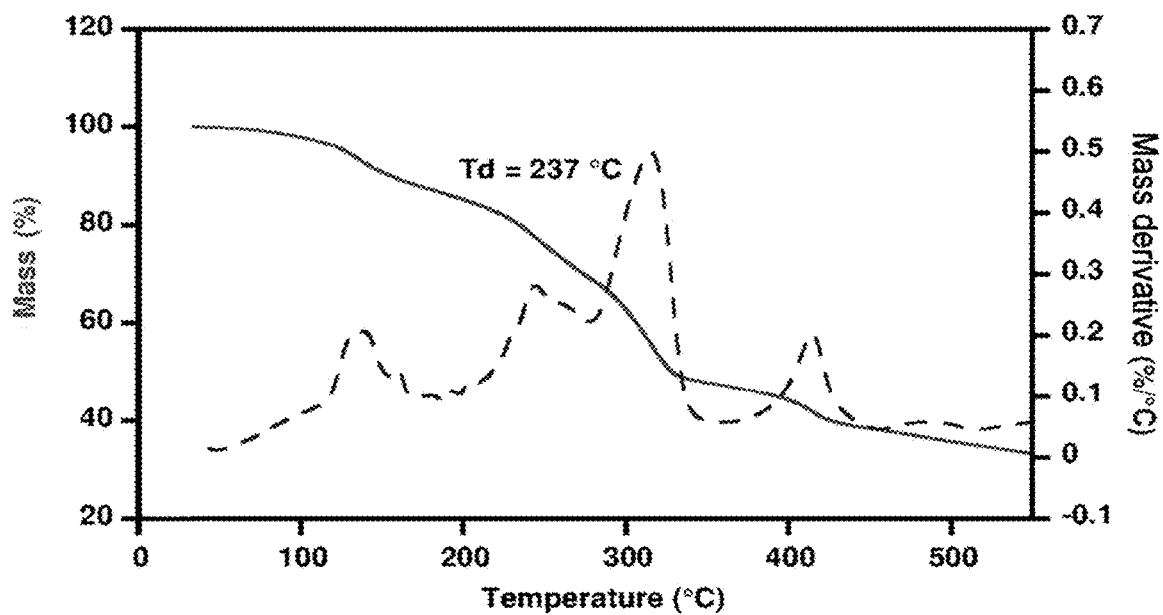
Figure 26:
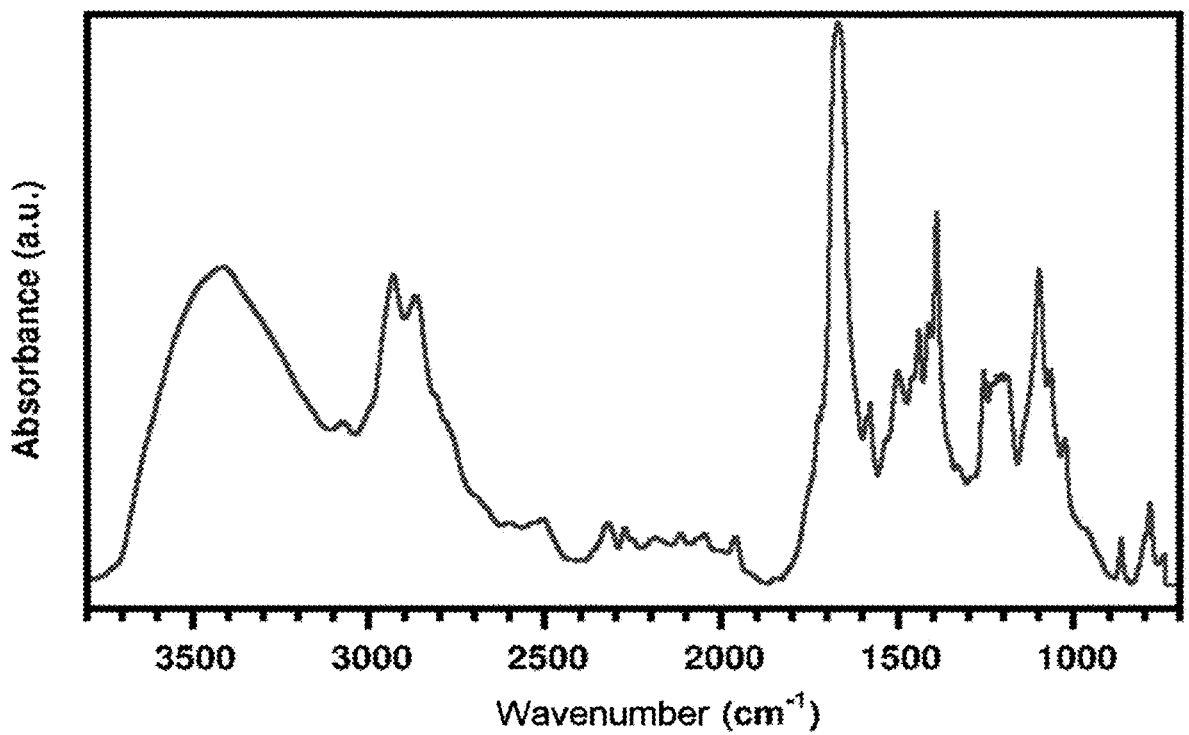
Figure 27:
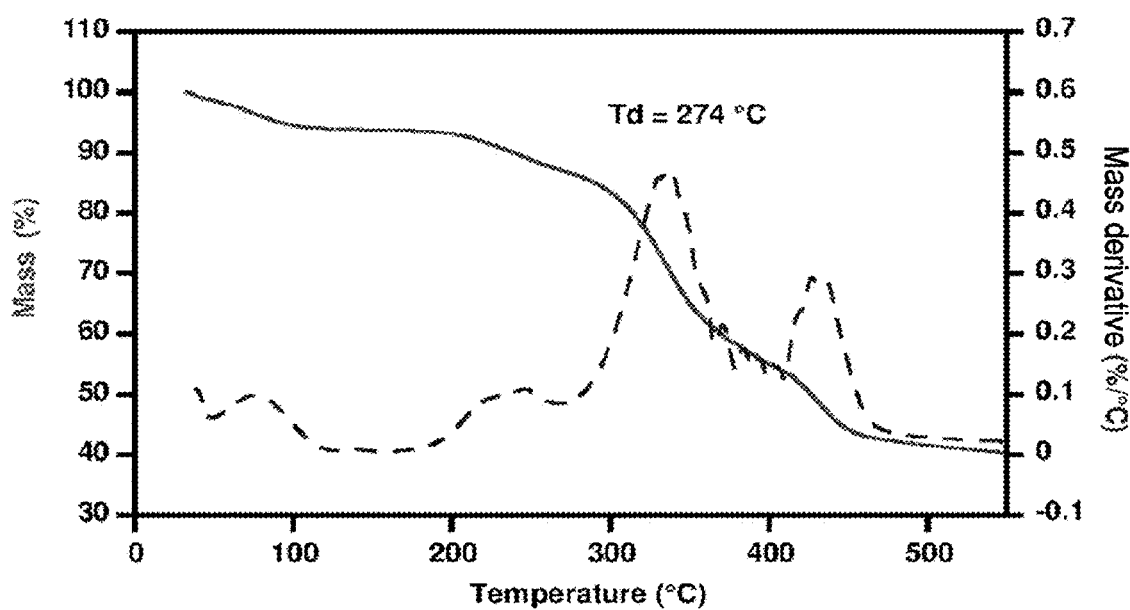
Figure 28:
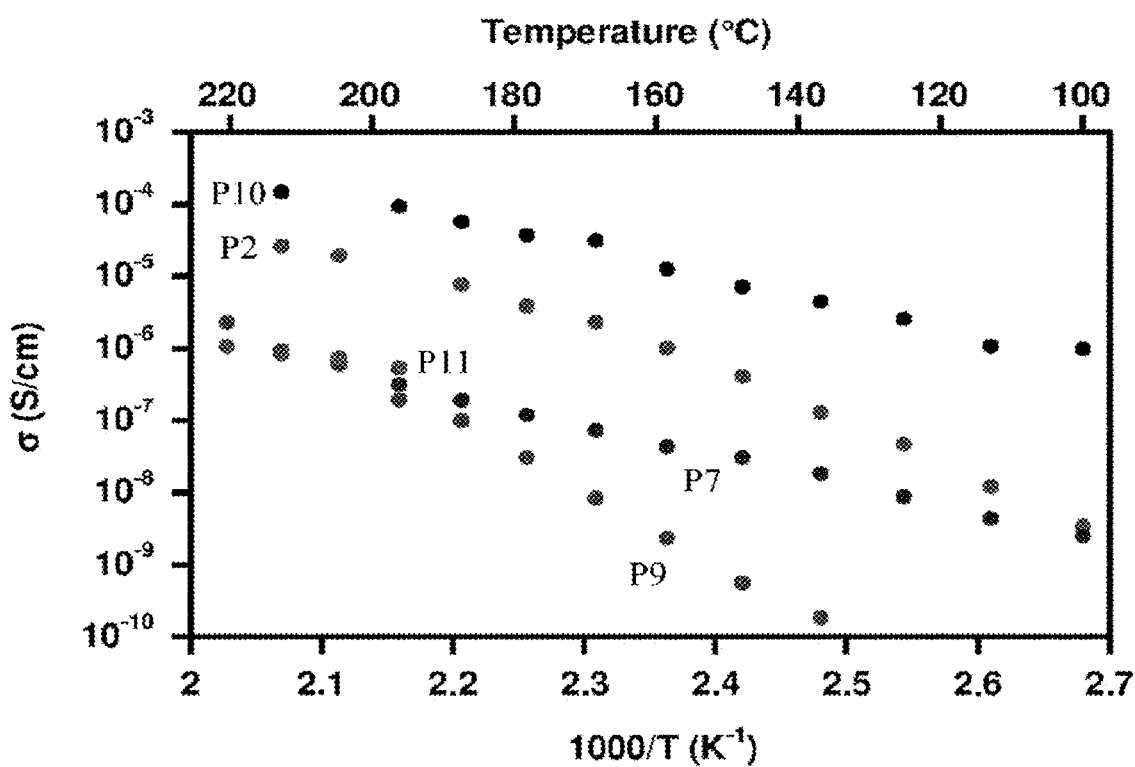

FIG. 1: Infrared spectrum of polymer P1 in accordance with the invention formed according to example 1;

FIG. 2: Infrared spectrum of lithiated polymer P1 in accordance with the invention formed according to example 2;

FIG. 3: TGA Thermogravimetric analysis diagram obtained for the lithiated polymer powder P1 formed according to example 2;

FIG. 4: Image obtained with a polarized light microscope of the lithiated polymer P1 in the organized (crystalline) state, prepared according to example 2 on a silicon substrate;

FIG. 5: XRD diagram obtained for the lithiated polymer P1 in the organized (crystalline) state, prepared according to example 2;

FIG. 6: Schematic representation of the TLM structure and of the total resistance characteristic as a function of the distance between the contacts;

FIG. 7: Infrared spectrum of polymer P2 in accordance with the invention formed according to example 4;

FIG. 8: TGA Thermogravimetric analysis diagram obtained for the polymer powder P2 formed according to example 4;

FIG. 9: Infrared spectrum of lithiated polymer P2 in accordance with the invention formed according to example 5;

FIG. 10: image obtained with a polarized light microscope of the lithiated polymer P2 in the organized (crystalline) state, prepared according to example 5 on a copper substrate;

FIG. 11: XRD diagram obtained for the lithiated polymer P2 in the organized (crystalline) state, prepared according to example 5;

FIG. 12: Infrared spectrum of polymer P3 in accordance with the invention formed according to example 6;

FIG. 13: TGA thermogravimetric analysis diagram obtained for the powder of polymer P3 formed according to example 6;

FIG. 14: Infrared spectrum of polymer P6 in accordance with the invention formed according to example 10;

FIG. 15: Infrared spectrum of polymer P7 in accordance with the invention formed according to example 11;

FIG. 16: TGA thermogravimetric analysis diagram obtained for the powder of polymer P7 formed according to example 11;

FIG. 17: Infrared spectrum of polymer P8 in accordance with the invention formed according to example 12;

FIG. 18: TGA thermogravimetric analysis diagram obtained for the powder of polymer P8 formed according to example 12;

FIG. 19: Conductivity of polymer P2 obtained as a function of the temperature, formed according to example 4;

FIG. 20: Infrared spectrum of Pro-ANTFSA in accordance with the invention formed according to example 13, step 3;

FIG. 21: Monitoring of the change in pH as a function of the molar amount of LiOH.H$_2$O for example 13, step 4;

FIG. 22: Infrared spectrum of polymer P9 in accordance with the invention formed according to example 15;

FIG. 23: TGA thermogravimetric analysis diagram obtained for the powder of polymer P9 formed according to example 15;

FIG. 24: Infrared spectrum of polymer P10 in accordance with the invention formed according to example 16;

FIG. 25: TGA thermogravimetric analysis diagram obtained for the powder of polymer P10 formed according to example 16;

FIG. 26: Infrared spectrum of polymer P11 in accordance with the invention formed according to example 17;

FIG. 27: TGA thermogravimetric analysis diagram obtained for the powder of polymer P11 formed according to example 17;

FIG. 28: Ion conductivity of polymers P2, P7, P9, P10 and P11 obtained as a function of the temperature under the planes of a rheometer.

EXAMPLES

Example 1

Preparation of a Polymer P1 in Accordance with the Invention from Lithium 4-Amino-1-Naphthalenesulfonate and Butadiene Diepoxide

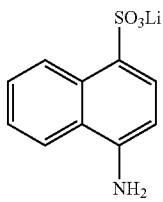

Synthesis of Lithium 4-amino-1-naphthalenesulfonate (LiAN)

1.340 g of 4-amino-1-naphthalenesulfonic acid (HAN) and 0.210 g of lithium hydroxide monohydrate (LiOH.H$_2$O) are placed in 20 mL of distilled water. The reaction medium is stirred overnight at room temperature. The excess HAN is removed by filtration. The filtrate is then concentrated by evaporating off the solvent under reduced pressure. After washing twice with ethanol, a pink powder is obtained. Monocrystals were obtained by crystallization from water.

The x-ray diffraction (XRD) analysis shows that the LiAN crystallizes in a monoclinic lattice (lattice parameters: a=12.14 Å, b=9.67 Å, c=11.94 Å and α=90°, β=115.93°, γ=90°).

$^1$H NMR (400 MHz; DMSO-d6; 300 K): δ ppm 7.89 (dd, 1H); 7.18 (dd, 1H); 6.83 (d, 1H); 6.52 (m, 2H); 5.68 (d, 1H); 4.96 (s, 2H).

$^{13}$C NMR (400 MHz; DMSO-d6; 300 K): δ ppm 146.11; 132.34; 130.61; 128.10; 126.45; 125.33; 123.56; 122.94; 122.26; 105.17.

$^7$Li NMR (400 MHz; D$_2$O); δ ppm 0.157

Synthesis of the Polymer

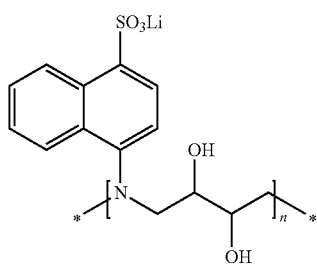

2.96 g of LiAN (12.93 mmol) prepared previously, 0.77 mL of butadiene diepoxide "BdO" (12.93 mmol) and 10 mL of dimethylformamide DMF are placed in a three-necked round-bottomed flask equipped with a condenser and a magnetic bar. The reaction mixture is stirred and heated at 55° C. under an inert atmosphere (flushing with a stream of argon) overnight. The reaction mixture is then heated to 100° C. to complete the polymerization.

At the end of the reaction, the solvent is evaporated off under reduced pressure, and a stable pale yellow powder is obtained.

The infrared spectrum of the polymer obtained, denoted as P1, is shown in FIG. 1.

Example 2

Preparation of a Film of Lithiated Polymer P1 in its Organized State Lithiation of Polymer P1

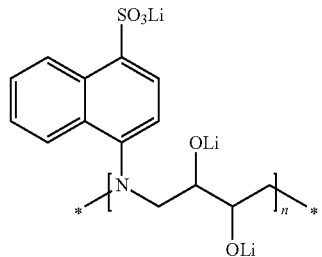

At the end of the reaction during the synthesis of polymer P1 as described in example 1, 0.82 g of lithium hydride LiH (103.44 mmol), i.e. four equivalents relative to the hydroxyl functions present, are added. The mixture is maintained at 70° C. to about 4 hours. The excess lithiating agent is neutralized by gradual addition of 1 mL of ethanol. The solvent is removed under reduced pressure to give a yellow powder.

The infrared spectrum of the lithiated polymer P1 obtained is shown in FIG. 2.

The powder obtained was also characterized by thermogravimetric analysis (TGA) under argon and with a heating rate of 20° C./min. The results of the thermogravimetric analysis are shown in FIG. 3.

Preparation of a Film of Conductive Polymer in its Organized State

A solution of the lithiated polymer P1 in methanol at a concentration of 100 mg/mL is prepared.

Deposition is performed on various substrates (stainless steel, polyimide (Kapton®), silicon, glass) covered with a crystallizing dish.

A film of the conductive polymer in an organized (crystalline) state is obtained overnight.

This organization is observable by polarized light microscopy.

FIG. 4 shows, for example, the image obtained by microscopy of the electrolyte film formed on the surface of silicon.

X-ray diffraction (XRD) analysis (x-ray diffractogram shown in FIG. 5) shows that the polymer in the organized state crystallized in an orthorhombic lattice (lattice parameters: a=6.49 Å, b=10.01 Å and c=4.85 Å).

Example 3

Measurement of the Ion Conductivity of the Lithiated Polymer P1

The ion conductivity the lithiated polymer P1 prepared according to example 2 is evaluated by measuring the resistance of the contacts according to the TLM (transmission line method) method.

Deposits of polymer prepared according to example 2 in an organized (crystalline) state and in amorphous and semicrystalline states, are produced on the device for measuring the TLM ion conductivity.

FIG. 6 schematically shows the TLM structure and of the total resistance characteristic as a function of the distance between the contacts. The standard method consists in depositing on a rectangular sample several contacts (A, B, C and D) in the form of parallel lines. The distance between the contacts is different so as to create a resistance scale. In the case of a homogeneous material, the resistance produced varies linearly as a function of the distance between two measurement contacts, and it is then possible to extract therefrom the value at the origin which represents the sum of the resistances of the two contacts.

The ion conductivities obtained for the various deposits are presented in table 1 below, bearing in mind that the electrolyte was not anhydrous.

TABLE 1

| Polymer deposit | Amorphous (not compliant) | Semicrystalline (not compliant) | Crystalline (invention) |
|---|---|---|---|
| Conductivity (mS/cm) | $3.5 \times 10^{-2}$ | $7.2 \times 10^{-1}$ | 2.1 |

The polymer in its crystalline and hydrated organized state shows good ion conductivity. It may advantageously be used as a solid electrolyte in a lithium battery with an electrochemical couple chosen so that the two materials are in the electrochemical stability zone of water.

Example 4

Preparation of a Polymer P2 in Accordance with the Invention from Lithium 4-Amino-1-Naphthalenesulfonate (LiAN) and 1,4-butanediol diglycidyl ether (BDGE)

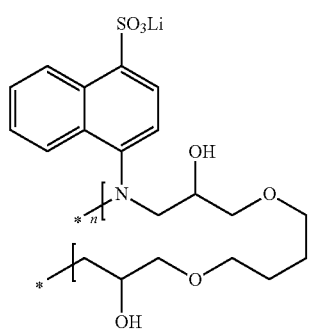

Polymer P2 is synthesized according to a protocol similar to that presented in example 1, using 2.38 mL of 1,4-butanediol diglycidyl ether (12.93 mmol) in place of BdO, 2.96 g of LiAN (12.93 mmol) and 10 mL of DMF. The temperature is set at 70° C. at the start of the reaction. An orange-yellow powder is obtained. The glass transition temperature (Tg) is 84° C.

The infrared spectrum of polymer P2 obtained is shown in FIG. 7.

The powder obtained was also characterized by thermogravimetric analysis (TGA) under argon and with a heating rate of 20° C./min. The results of the thermogravimetric analysis are shown in FIG. 8.

Example 5

Preparation of a Film of Lithiated Polymer P2 in its Organized State Lithiation of Polymer P2

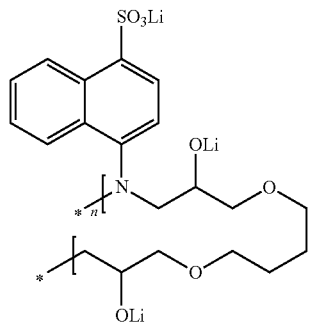

The hydroxyl functions of polymer P2 prepared in example 4 are lithiated according to a protocol similar to that of example 2, by adding, at the end of the reaction during the synthesis of polymer P2, 0.82 g of lithium hydride LiH (103.44 mmol), i.e. four equivalents relative to the hydroxyl functions present. The mixture is maintained at 70° C. for about four hours. The excess LiH is neutralized by gradual addition of 1 mL of ethanol. The solvent is removed under reduced pressure to give a yellow powder.

The infrared spectrum of the lithiated polymer P2 obtained is shown in FIG. 9.

Preparation of a Film of Conductive Polymer in its Organzied State

A solution of the lithiated polymer P2 in methanol at a concentration of 100 mg/mL is prepared.

Deposition is performed on various substrates (stainless steel, polyimide (Kapton®), silicon, glass) covered with a crystallizing dish.

A film of the conductive polymer in an organized (crystalline) state is obtained overnight.

This organization is observable by polarized light microscopy.

FIG. 10 shows, for example, the image obtained by microscopy of the electrolyte film formed on the surface of a copper substrate.

X-ray diffraction (XRD) analysis (x-ray diffractogram shown in FIG. 11) shows that the polymer in the organized state crystallized in an orthorhombic lattice.

Example 6

Preparation of a Polymer P3 in accordance with the Invention from Lithium 4-Amino-1-Naphthalenesulfonate (LiAN) and Resorcinol Diglcidyl Ether (RDGE)

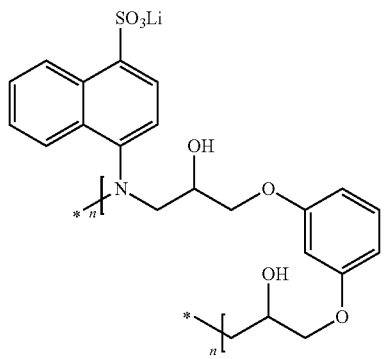

Polymer P3 is synthesized according to a protocol similar to that presented in example 1, using 2.87 g of resorcinol diglycidyl ether (12.93 mmol) in place of BdO, 2.96 g of LiAN (12.93 mmol) and 10 mL of DMF. The temperature is set at 70° C. at the start of the reaction. An orange-yellow powder is obtained. The glass transition temperature (Tg) is 136° C.

The infrared spectrum of polymer P3 obtained is shown in FIG. 12.

The powder obtained was also characterized by thermogravimetric analysis (TGA) under argon and with a heating rate of 20° C./min. The results of the thermogravimetric analysis are shown in FIG. 13.

Example 7

Preparation of a Film of Lithiated Polymer P3 in its Organzied State Lithiation of Polymer P3

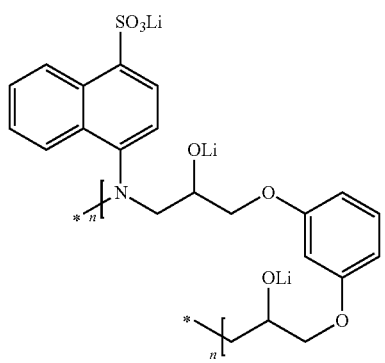

The hydroxyl functions of polymer P3 prepared in example 6 are lithiated according to a protocol similar to that of example 2, adding, at the end of the reaction during the synthesis of polymer P3, 0.82 g of lithium hydride LiH (103.44 mmol), i.e. four equivalents relative to the hydroxyl functions present. The mixture is maintained at 70° C. for about four hours. The excess LiH is neutralized by gradual addition of 1 mL of ethanol. The solvent is removed under reduced pressure to give a yellow powder.

Preparation of a Film of Conductive Polymer P3 in its Organzied State

A solution of the lithiated polymer P3 in methanol at a concentration of 100 mg/mL is prepared.

Deposition is performed on various substrates (stainless steel, polyimide (Kapton®), silicon, glass) covered with a crystallizing dish.

A film of the conductive polymer in an organized (crystalline) state is obtained overnight and can be observed by polarized light microscopy.

Example 8

Preparation of a Polymer P4 in Accordance with the Invention from 4-Amino-1-Naphthalenesulfonic Acid and Butadiene Diepoxide

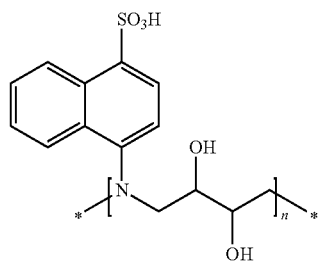

2.89 g of 4-amino-l-naphthalenesulfonic acid HAN (12.93 mmol), 0.77 mL of butadiene diepoxide BdO (12.93 mmol) and 10 mL of dimethylformamide DMF are placed in a three-necked round-bottomed flask equipped with a condenser and a magnetic bar. The reaction mixture is stirred and heated at 55° C. under an inert atmosphere (flushing with a stream of argon) until a homogeneous mixture is obtained. The reaction mixture is then heated to 100° C. to complete the polymerization. At the end of the reaction, the solvent is evaporated off under reduced pressure, and a stable pale yellow powder is obtained.

Polymer P4 in its organized state may be used as a proton-conducting electrolyte, for example in a proton-exchange-membrane fuel cell (PEMFC) or a low-temperature electrolyzer.

Example 9

Preparation of a Polymer P5 in Accordance with the Invention from 4-Amino-1-Naphthalenesulfonic Acid and 1,4-Butanediol Diglycidyl Ether (BDGE)

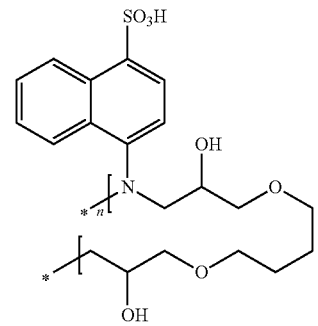

Polymer P5 is synthesized according to a protocol similar to that of the preceding example 8, using 2.38 mL of 1,4-butanediol diglycidyl ether BDGE (12.93 mmol) in place of BdO, 2.89 g of HAN (12.93 mmol) and 10 mL of DMF. The temperature is set at 70° C. at the start of the reaction. An orange-yellow powder is obtained.

Polymer P5 in its organized state may be used as a proton-conducting electrolyte.

Example 10

Preparation of a polymer P6 in Accordance with the Invention from 4-Amino Acid and Resorcinol Diglycidyl Ether (RDGE)

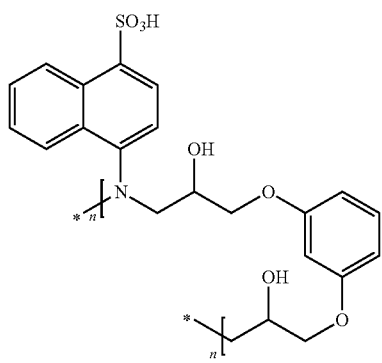

Polymer P6 is synthesized according to a protocol similar to that of the preceding example 8, using 2.87 g of resorcinol diglycidyl ether RDGE (12.93 mmol) in place of BdO, 2.89 g of HAN (12.93 mmol) and 10 mL of DMF. The temperature is set at 70° C. at the start of the reaction. An orange-yellow powder is obtained.

The infrared spectrum of polymer P6 obtained is shown in FIG. 14. The glass transition temperature (Tg) is 37° C.

Polymer P6 in its organized state may be used as a proton-conducting electrolyte.

Example 11

Preparation of a Polymer P7 in Accordance with the Invention from Lithium 4-Amino-1-Naphthalenesulfonate (LiAN) and poly(dimethylsiloxane) diglycidyl ether (PDMSDGE)

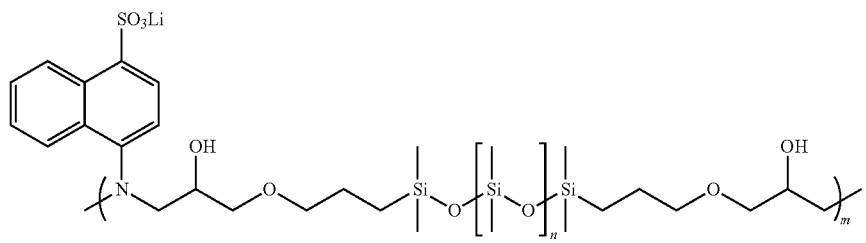

Polymer P7 is synthesized according to a protocol similar to that presented in example 1, using 11.59 g of poly(dimethylsiloxane) diglycidyl ether (11.83 mmol) in place of BdO, 2.71 g of LiAN (11.83 mmol) and 15 mL of DMF. The temperature is set at 70° C. at the start of the reaction. A brown powder is obtained.

The infrared spectrum of polymer P7 obtained is shown in FIG. 15.

The powder obtained was also characterized by thermogravimetric analysis (TGA) under argon and with a heating rate of 20° C./min. The results of the thermogravimetric analysis are shown in FIG. 16.

Example 12

Preparation of a polymer P8 in Accordance with the Invention from 4-Amino-1-Naphthalenesulfonic Acid and poly(dimethylsiloxane) diglycidyl ether (PDMSDGE)

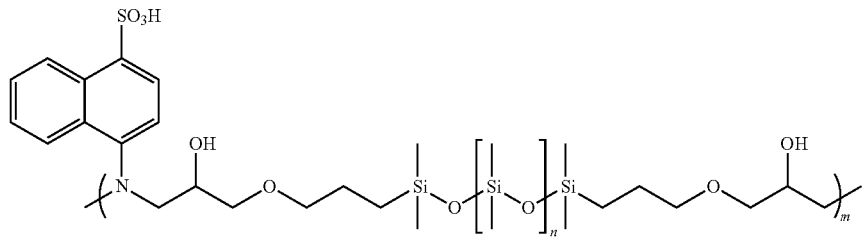

Polymer P8 is synthesized according to a protocol similar to that of the preceding example 8, using 11.39 g of poly(dimethylsiloxane) diglycidyl ether PDMSDGE (11.62 mmol) in place of BdO, 2.59 g of HAN (11.62 mmol) and 10 mL of DMF. The temperature is set at 70° C. at the start of the reaction. A viscous yellow paste is obtained.

The infrared spectrum of polymer P8 obtained is shown in FIG. 17.

The polymer obtained was also characterized by thermogravimetric analysis
(TGA) under argon and with a heating rate of 20° C./min. The results of the thermogravimetric analysis are shown in FIG. 18. The glass transition temperature (Tg) is 24° C.

Polymer P8 in its organized state may be used as a proton-conducting electrolyte.

Example 13

Measurement of the Ion Conductivity of the Lithiated Polymer P2

The ion conductivity of polymer P2 is evaluated by measuring the resistance of two interdigitated gold electrodes (NOVOCONTROL) over a temperature range extending from 100° C. to 215° C.

Polymer P2 powder is deposited so as to cover the device. To ensure good impregnation, the polymer is maintained at 150° C. for 15 minutes. The images obtained with a polarized light microscope are shown in FIG. 19.

TABLE 2

| Polymer state | Transition Glassy → Mesophase | Mesophase → Isotropic |
|---|---|---|
| Transition temperature (° C.) | 50 | 210 |

The ion conductivities obtained for the various deposits are shown in FIG. 20.

The polymer in its organized state shows good ion conductivity. It may advantageously be used as a solid electrolyte in a lithium battery.

Example 14

Synthesis of lithium 4-amino-1-naphthalentrifluorosulfonamide (LiANTFSI)

Step 1: Protection of the Primary Amine (Pro-HAN)

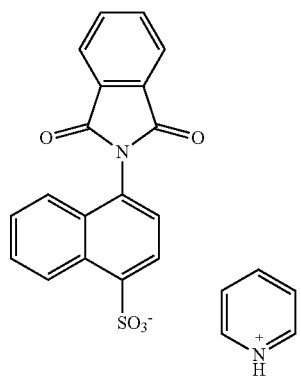

4.77 g of 4-amino-1-naphthalenesulfonic acid HAN (20.73 mmol), 3.4 mL of phthaloyl chloride (21.25 mmol) and 30 mL of pyridine are placed in a three-necked round-bottomed flask equipped with a condenser and a magnetic bar. The reaction mixture is stirred and heated at 100° C. under an inert atmosphere (flushing with a stream of argon) for 17 hours. At the end of the reaction, the solvent is evaporated off under reduced pressure. A pale yellow precipitate is obtained after recrystallization from methanol. (Yield=42%) $^1$H NMR (200 MHz; DMSO-d6; 300 K): δ ppm 8.94 (m, 3H); 8.58 (m, 1H); 7.74 (m, 12H);

Step 2: Synthesis of the Thionyl Chloride Derivative (Pro-ANSO$_2$Cl)

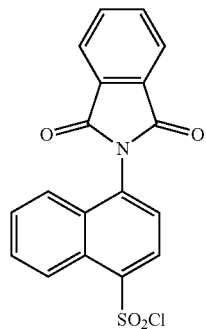 [SMILES: O=C1c2ccccc2C(=O)N1c1ccc(S(=O)(=O)Cl)c2ccccc12]

2.35 g of Pro-HAN (5.43 mmol), 0.7 mL of thionyl chloride (9.68 mmol) and 11 mL of dimethylformamide (DMF) are placed in a three-necked round-bottomed flask equipped with a condenser and a magnetic bar. The reaction mixture is stirred for 3 hours at room temperature under an inert atmosphere (flushing with a stream of argon). The reaction is stopped by pouring the reaction medium into cold distilled water. After filtration and drying, a white precipitate is obtained (yield=100%).

$^1$H NMR (400 MHz; DMSO-d6; 300 K): δ ppm 8.94 (dd, 1H); 8.01 (m, 5H); 7.75 (m, 1H); 7.57(m, 3H);

Step 3: Synthesis of the TFSI Derivative (Pro-ANTFSA)

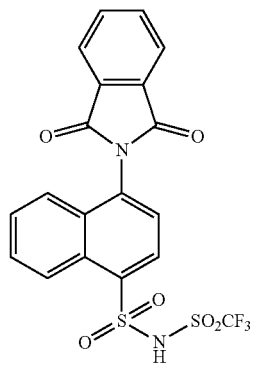

403.5 mg of Pro-ANSO$_2$Cl (1.08 mmol), 163.7 mg of trifluoromethanesulfonamide (1.08 mmol), 11.2 mg of 4-(dimethylamino)pyridine (DMAP), 0.23 g of triethylamine (TEA) and 5 mL of dichloromethane (CH$_2$Cl$_2$) are placed in a three-necked round-bottomed flask equipped with a condenser and a magnetic bar. The reaction mixture is stirred for 16 hours at room temperature under an inert atmosphere (flushing with a stream of argon). After extraction, 2x5 mL of 4% NaHCO$_3$ and 1×5 mL of 1M HCl, the organic phase is evaporated. A yellow oil is then obtained.

The infrared spectrum of the product obtained is shown in FIG. 21.

Step 4: Synthesis of Li-ANTFSI

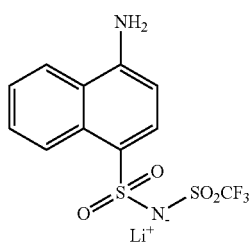

522.72 mg of Pro-ANTSFA (1.08 mmol), 163.7 mg of trifluoromethanesulfonamide (1.08 mmol), 1.2 mL of hydrazine monohydrate and 8.6 mL of methanol are placed in a three-necked round-bottomed flask equipped with a condenser and a magnetic bar. The reaction mixture is stirred for 17 hours at room temperature under an inert atmosphere (flushing with a stream of argon). The precipitate obtained is filtered off and washed with methanol. The filtrate is evaporated.

The product obtained is dissolved in 20 mL of distilled water and 52 mg (1.23 mmol) of lithium hydroxide hydrate. pH monitoring was performed during the lithiation and is shown in FIG. 22.

The product is obtained after evaporating off the solvent and washing several times with ethanol.

Example 15

Preparation of a Polymer P9 in Accordance with the Invention from Lithium 4-Amino-1-Naphthalenesulfonate (LiAN) and Diglycidyl Ether (DGE)

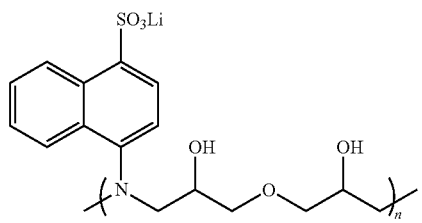

Polymer P9 is synthesized according to a protocol similar to that presented in example 1, using 100 mg of diglycidyl ether (0.77 mmol) in place of DGE, 0.176 g of LiAN (0.176 mmol) and 5 mL of DMF. The temperature is set at 70° C. at the start of the reaction. A light brown powder is obtained.

The infrared spectrum of polymer P7 obtained is shown in FIG. 23.

The powder obtained was also characterized by thermogravimetric analysis (TGA) under argon and with a heating rate of 10° C./min. The results of the thermogravimetric analysis are shown in FIG. 24.

Example 16

Preparation of a polymer P10 in Accordance with the Invention from Lithium 4-Amino-1, 7-Naphthalenedisulfonate (LiDiAN) and Butanediol Diglycidyl Ether (BDGE)

Synthesis of Lithium 4-Amino-1-Naphthalenedisulfonate (LiDiAN)

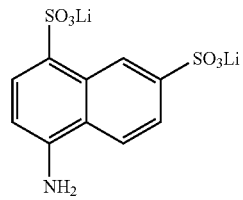

0.483 g of 4-amino-1,7-naphthalenesulfonic acid (Di-HAN) and 0.067 g of lithium hydroxide monohydrate (LiOH.H$_2$O) are place in 10 mL of distilled water. The reaction medium is stirred overnight at room temperature. The excess HAN is removed by filtration. The filtrate is then concentrated by evaporating off the solvent under reduced pressure. After washing twice with ethanol, an orange powder is obtained.

Synthesis of the Polymer

Polymer P10 is synthesized according to a protocol similar to that presented in example 1, using 0.16 mL of 1,4-butanediol diglycidyl ether (0.85 mmol) in place of BdO, 0.2685 g of LiDiAN (0.85 mmol) and 5 mL of DMF. The temperature is set at 70° C. at the start of the reaction. A brown powder is obtained.

The infrared spectrum of polymer P10 obtained is shown in FIG. 25.

The powder obtained was also characterized by thermogravimetric analysis (TGA) under argon and with a heating rate of 10° C./min. The results of the thermogravimetric analysis are shown in FIG. 26.

Example 17

Preparation of a polymer P11 in Accordance with the Invention from Lithium 5-Amino-1-Naphthalenesulfonate and Butadiene Diepoxide Synthesis of Lithium 5-Amino-1-Naphthalenesulfonate (LiAN')

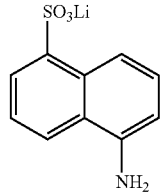

24.44 g of 5-amino-1-naphthalenesulfonic acid (HAN') and 4.13 g of lithium hydroxide monohydrate (LiOH.H$_2$O) are placed in 500 mL of distilled water. The reaction medium is stirred overnight at room temperature. The excess HAN' is removed by filtration. The filtrate is then concentrated by evaporating off the solvent under reduced pressure. After washing twice with ethanol, a violet-colored powder is obtained.

$^1$H NMR (400 MHz; pyridine-d6; 300 K): δ ppm 9.2 (d, 1H); 8.5 (d, 1H); 7.3 (m, 4H); 5.92 (s, 2H);

Synthesis of the Polymer

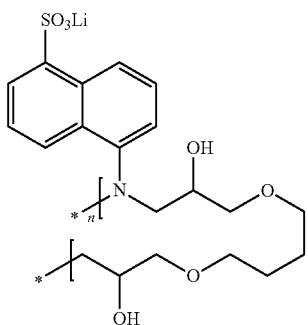

Polymer P10 is synthesized according to a protocol similar to that presented in example 1, using 2.37 mL of 1,4-butanediol diglycidyl ether (12.25 mmol) in place of BdO, 2.81 g of LiAN' (12.25 mmol) and 15 mL of DMF. The temperature is set at 70° C. at the start of the reaction. A dark brown powder is obtained.

The infrared spectrum of the polymer obtained, denoted as P11, is shown in FIG. 27.

The powder obtained was also characterized by thermogravimetric analysis (TGA) under argon and with a heating rate of 10° C./min. The results of the thermogravimetric analysis are shown in FIG. 28.

Example 18

Measurement of the Phase Transitions by POM of Polymer P7

Polymer P7 powder is deposited on a glass microscope plate. The sample is placed in a mounting plate and its state is observed at various temperatures. Table 3 reports the transitions observed. The images obtained with a polarized light microscope are shown in FIG. 27.

TABLE 3

| Polymer state | Transition Glassy → Mesophase | Mesophase → Isotropic |
|---|---|---|
| Transition temperature (° C.) | 40 | 235 |

Example 19

Measurement of the Ion Conductivity of the Polymers P

The ion conductivity of the polymers P was evaluated by measuring the resistance of two aluminum plates of a rheometer over a temperature range extending from 100° C. to 215° C.

The results obtained are shown in FIG. 28.

The invention claimed is:

1. A compound comprising at least one species of formula (I):

wherein:
$A^{x-}$ is an anion of valency x equal to 1 or 2 chosen from sulfonate, sulfonylimide of —SO$_2$—N$^-$—SO$_2$C$_y$F$_{2y+1}$ type with y being an integer between 0 and 4; borate, borane, phosphate, phosphinate, phosphonate, silicate, carbonate, sulfide, selenate, nitrate and perchlorate anions;
$C^{x+}$ is a counter-cation of the anion $A^{x-}$, chosen from a proton H$^+$ and alkali metal and alkaline-earth metal cations:
p is an integer ranging from 1 to 10;
E is an organic spacer comprising a linear sequence of at least two covalent bonds;
n is an integer greater than or equal to 2; and
G represents:
(a) a group

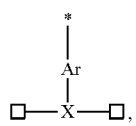

in which:
X represents N, P or Si—R, with R representing a hydrogen atom or a C$_{1-4}$-alkyl group,
Ar represents a polycyclic group formed from 2 to 6 rings, at least one of which is aromatic, each ring being, independently of each other, 4- to 6-membered, said polycyclic group possibly including up to 18 heteroatoms;
-□ represents a bond with the spacer E; and
-* represents one or more bonds with said anions $A^{x-}$;
or (b) a group

in which:
$X_1$ and $X_2$, which may be identical or different, represent NR, O or S, with R representing a hydrogen atom or a C$_{1-4}$-alkyl group; -□ represents a bond with the spacer E; and
-* represents one or more bonds with said anions $A^{x-}$;
Ar is as defined previously;
said anion(s) $A^{x-}$ being covalently bonded to the polycyclic group Ar.

2. The compound as claimed in claim 1, said compound being a polymer comprising, or even being formed from, monomer units of formula (I') below:

in which G, E, $A^{x-}$, $C^{x+}$ and p are as defined in claim 1.

3. The compound as claimed in claim 1, said compound being a polymer comprising, or even being formed from, monomer units of formula (II):

in which E, Ar, $A^{x-}$, $C^{x+}$ and p are as defined in claim 1.

4. The compound as claimed in claim 1, wherein Ar has one of the following polycyclic backbones:

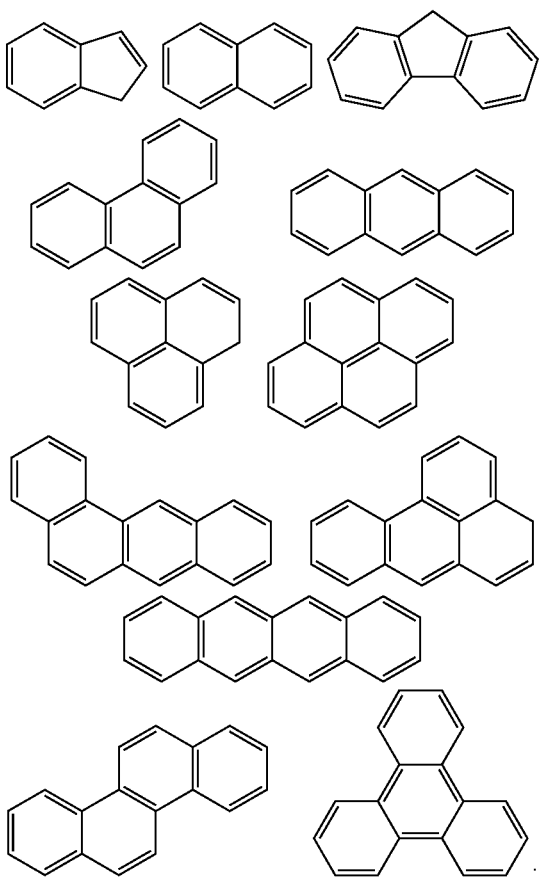

5. The compound as claimed in claim 1, wherein Ar is an aromatic bicyclic group.

6. The compound as claimed in claim 1, wherein E is a linear or branched, saturated or unsaturated aliphatic chain, containing at least two double bonds, said chain being optionally interrupted with one or more heteroatoms, with one or more metalloids, and/or with one or more aromatic or nonaromatic, 4- to 6-membered (hetero)cycles; said chain being optionally substituted with one or more fluorine atoms and/or with one or more groups $R_1$, $R_1$ representing a group chosen from a hydroxyl group, optionally in protonated form —O⁻C⁺; an —NH₂ group and an oxo group.

7. The compound as claimed in claim 1, wherein E represents a saturated linear $C_4$ to $C_{20}$ aliphatic chain, said chain being optionally interrupted with one or more heteroatoms, and/or with one or more aromatic or nonaromatic 4- to 6-membered rings, said chain being optionally substituted with one or more hydroxyl groups.

8. The compound as claimed in claim 7, wherein said optional heteroatom is an oxygen atom.

9. The compound as claimed in claim 7, wherein said optional aromatic or nonaromatic 4- to 6-membered ring is a benzene ring.

10. The compound as claimed in claim 7, wherein said optional hydroxyl group is in a protonated form —O⁻C⁺.

11. The compound as claimed in claim 1, wherein n is between 2 and 1500.

12. The compound as claimed in claim 1, wherein $A^{x-}$ is a sulfonate anion or a trifluoromethylsulfonylimide anion.

13. The compound as claimed in claim 1, wherein $C^{x+}$ is a proton H⁺ or the Li⁺ cation.

14. The compound as claimed in claim 1, said compound being a polymer comprising, or even being formed from, monomer units of formula (III):

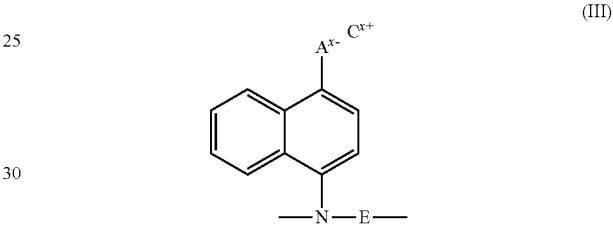

in which E, $A^{X-}$ and $C^{x+}$ are as defined in claim 1.

15. The compound as claimed in claim 1, wherein $X_1$ and $X_2$ both represent NH or O.

16. The compound as claimed in claim 1, wherein Ar is an aromatic bicyclic group with a naphthalene aromatic backbone.

17. The compound as claimed in claim 1, wherein Ar is a naphthalene group.

18. The compound as claimed in claim 1, wherein E is a linear or branched, saturated or unsaturated aliphatic chain, containing at least two double bonds, said chain being optionally interrupted with one or more heteroatoms, with one or more metalloids, and/or with one or more aromatic or nonaromatic, 4- to 6-membered (hetero)cycles; said chain being optionally substituted with one or more fluorine atoms and/or with one or more groups $R_1$, $R_1$ representing a group chosen from a hydroxyl group, optionally in protonated form —O⁻C⁺; an —NH₂ group.

19. A solid electrolyte comprising, one or more compounds as claimed in claim 1, in the organized state.

20. The electrolyte as claimed in claim 19, said electrolyte having an ion conductivity at 120° C. of greater than or equal to $10^{-9}$ S/cm.

21. The electrolyte as claimed in claim 19, said electrolyte an ion conductivity at 200° C. of greater than or equal to $10^{-7}$ S/cm.

22. A process for forming a film comprising a solid electrolyte on the surface of a substrate, comprising:
(a1) adding a solution comprising at least one compound as claimed in claim 1 in a polar solvent;
(b1) depositing said solution from (a1) onto the surface of said substrate; and (c1) evaporating the solvent under conditions suitable for forming a film comprising the solid electrolyte formed from the compound of formula (I) in its organized state.

23. The process as claimed in claim 22, wherein said film comprising the solid electrolyte has a thickness of between 5 and 50 µm.

24. The process as claimed in claim 22, said process further comprising exposing said film formed to an electric or magnetic field or to ionizing radiation.

25. A process for forming a solid electrolyte film, which is self-supported or supported on a substrate, comprising:
   (a2) forming a powder from a compound as claimed in claim 1;
   (b2) melt-extruding said powder in the form of a solid electrolyte film formed from said compound of formula (I) in its organized state; and
   (c2) spreading said electrolyte film optionally on the surface of a substrate.

26. The process as claimed in claim 25, in which said film comprising the solid electrolyte has a thickness of between 5 and 50 µm.

27. The process as claimed in claim 25, said process further comprising exposing said film formed to an electric or magnetic field or to ionizing radiation.

28. A composite electrode for an electrochemical system, comprising at least one solid electrolyte as claimed in claim 19.

29. An electrochemical system comprising a solid electrolyte as claimed in claim 19.

30. The electrochemical system as claimed in claim 29, comprising:
   a solid electrolyte film comprising the solid electrolyte, and
   at least one composite electrode comprising the solid electrolyte.

31. The system as claimed in claim 29, wherein the system is a battery.

32. The system as claimed in claim 29, said system being a lithium battery.

* * * * *